United States Patent
Lee et al.

(10) Patent No.: US 10,459,135 B2
(45) Date of Patent: Oct. 29, 2019

(54) OPTICAL MODULE AND ELECTRONIC DEVICE HAVING THE SAME

(71) Applicant: SAMSUNG ELECTRONICS CO., LTD., Suwon-si, Gyeonggi-do (KR)

(72) Inventors: Jeong Yeol Lee, Suwon-si (KR); Il Young Kim, Suwon-si (KR); Jeong Ho Cho, Hwaseong-si (KR); Seung Yong Kim, Suwon-si (KR); Jeong Min Park, Hwaseong-si (KR); Ki Huk Lee, Suwon-si (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 141 days.

(21) Appl. No.: 15/685,153

(22) Filed: Aug. 24, 2017

(65) Prior Publication Data
US 2018/0059298 A1     Mar. 1, 2018

(30) Foreign Application Priority Data

Aug. 24, 2016  (KR) .......................... 10-2016-0107395

(51) Int. Cl.
| | |
|---|---|
| *G02B 5/20* | (2006.01) |
| *G02B 5/22* | (2006.01) |
| *G02B 1/10* | (2015.01) |
| *H04N 5/33* | (2006.01) |
| *G06K 9/22* | (2006.01) |
| *G06K 9/00* | (2006.01) |
| *H04N 5/232* | (2006.01) |

(52) U.S. Cl.
CPC .............. *G02B 5/208* (2013.01); *G02B 1/10* (2013.01); *G02B 5/223* (2013.01); *H04N 5/33* (2013.01); *G06K 9/00604* (2013.01); *G06K 9/00617* (2013.01); *G06K 9/22* (2013.01); *H04N 5/23216* (2013.01)

(58) Field of Classification Search
CPC .......... G02B 5/208; G02B 1/10; G02B 5/223; H04N 5/33; H04N 5/23216; G06K 9/00604; G06K 9/00617; G06K 9/22
USPC ......................................... 348/164
See application file for complete search history.

(56) References Cited

U.S. PATENT DOCUMENTS

2016/0109783 A1    4/2016 Chen et al.

FOREIGN PATENT DOCUMENTS

| JP | 2008-186793 | 8/2008 |
|---|---|---|
| KR | 10-2010-0090521 | 8/2010 |
| KR | 10-2015-0138755 | 12/2015 |

*Primary Examiner* — Jared Walker
(74) *Attorney, Agent, or Firm* — Nixon & Vanderhye, P.C.

(57) ABSTRACT

An electronic device includes a housing that includes a first surface, a second surface, and a side surface, a display exposed through a first region of the first surface, an optical module disposed below a second region of the first surface that is adjacent to the first region of the first surface, and a processor. The first surface includes a glass layer, a film layer disposed under a rear surface of the glass layer and including an opening that overlaps at least part of the optical module and has a dimension corresponding to at least part of the optical module, and a visible-light-absorbing member comprising a visible-light-absorbing material disposed under the rear surface of the glass layer and overlapping at least part of the opening. The visible-light-absorbing member is configured to light in a first wavelength range and to allow light in a second wavelength range to pass through the visible-light-absorbing member.

11 Claims, 16 Drawing Sheets

OPTICAL MODULE AND ELECTRONIC DEVICE HAVING THE SAME

CROSS-REFERENCE TO RELATED APPLICATION

This application is based on and claims priority under 35 U.S.C. § 119 to a Korean patent application filed on Aug. 24, 2016 in the Korean Intellectual Property Office and assigned Serial number 10-2016-0107395, the disclosure of which is incorporated by reference herein in its entirety.

TECHNICAL FIELD

The present disclosure relates generally to an optical module and an electronic device having the same.

BACKGROUND

In recent years, optical modules (e.g., IR sensors using light in the infrared (IR) region) and electronic devices having the same have been widely used. IR sensors may irradiate light in the infrared wavelength range and may receive the light reflected from an object to sense the proximity of the object, measure ambient illuminance, or determine the shape of the object. These IR sensors may include, for example, proximity sensors, illuminance sensors, or iris sensors.

IR sensors may use light in the near-infrared (NIR) region (e.g., 810 to 850 nm) to improve iris recognition performance without being affected by ambient light sources. However, the wavelength range of light emitted by IR LEDs corresponding to light-emitting units of the IR sensors may include a region (e.g., 700 to 780 nm) in the visible wavelength range, and thus visible light emitted by the IR LEDs may be exposed to the outside.

Conventional IR sensors may have reflective coating or absorbent coating applied to lenses thereof to prevent and/or reduce visible light from being exposed to the outside. However, due to a wavelength shift depending on the incidence angle of light, the reflective coating may not completely prevent visible light from being exposed to the outside. Further, the absorbent coating may be less effective due to degradation in the transmittance of infrared radiation and a decrease in the visible-light blocking rate.

SUMMARY

Example aspects of the present disclosure address at least the above-mentioned problems and/or disadvantages and provide at least the advantages described below. Accordingly, an example aspect of the present disclosure provides an optical module including a visible-light-absorbing member, and an electronic device having the optical module.

Another example aspect of the present disclosure is to provide an optical module including a lens to which a visible-light-absorbing material is applied, and an electronic device having the optical module.

In accordance with an example aspect of the present disclosure, an electronic device includes a housing comprising a first surface facing a first direction, a second surface facing a second direction opposite the first direction, and a side surface surrounding at least part of space between the first surface and the second surface, a display disposed inside the housing and exposed through a first region of the first surface, an optical module comprising optical circuitry disposed inside the housing and configured to receive and/or emit infrared radiation, wherein the optical module is disposed below a second region of the first surface adjacent to the first region of the first surface, and a processor electrically connected with the display and the optical module. The first surface includes a glass layer that is substantially transparent, a film layer disposed under a rear surface of the glass layer and including an opening overlapping at least part of the optical module and having a dimension corresponding to at least part of the optical module when viewed from above the first surface, and a visible-light-absorbing member comprising a visible-light-absorbing material disposed under the rear surface of the glass layer, the visible-light-absorbing member overlapping at least part of the opening when viewed from above the first surface. The visible-light-absorbing member being configured to absorb light in a first wavelength range and to allow light in a second wavelength range to pass through the visible-light-absorbing member.

In accordance with another example aspect of the present disclosure, an electronic device includes a housing comprising a first surface facing a first direction, a second surface facing a second direction opposite the first direction, and a side surface surrounding at least part of space between the first surface and the second surface, a display disposed inside the housing and exposed through a first region of the first surface, an optical module comprising optical circuitry disposed inside the housing and configured to receive and/or emit infrared radiation, wherein the optical module is disposed below a second region of the first surface adjacent to the first region of the first surface, and a processor electrically connected with the display and the optical module. The first surface includes a glass layer that is substantially transparent, and a film layer disposed on a rear surface of the glass layer and including an opening overlapping at least part of the optical module and having a dimension corresponding to at least part of the optical module when viewed from above the first surface. The optical module includes an infrared sensor unit comprising infrared sensing circuitry that includes at least one of a light-emitting element configured to emit light to a subject and a light-receiving element configured to receive light reflected from the subject, and a lens disposed above the infrared sensor unit configured to adjust a beam angle of light emitted from the light-emitting element. The lens includes a visible-light-absorbing material configured to absorb light in a first wavelength range and to allow light in a second wavelength range to pass through the visible-light-absorbing material.

In accordance with another example aspect of the present disclosure, an electronic device includes a housing comprising a first surface facing a first direction, a second surface facing a second direction opposite the first direction, and a side surface surrounding at least part of space between the first surface and the second surface, a touch screen display disposed inside the housing and exposed through a first region of the first surface, a light-emitting element comprising light-emitting circuitry disposed to emit light through a first opening formed in a second region of the first surface adjacent to the first region of the first surface, a light-receiving element comprising light-receiving circuitry disposed to receive at least part of the emitted light through a second opening formed in a third region of the first surface, that is adjacent to the second region of the first surface, a layer disposed inside the housing to correspond to the second region, wherein the layer includes a material configured to allow infrared radiation emitted from the light-emitting element to pass through the material to the outside while absorbing at least part of visible light emitted from the light-emitting element from being released from the housing to the outside, at least one processor electrically connected with the touch screen display, the light-emitting element, and the light-receiving element, and a memory electrically connected with the at least one processor. The memory stores an instruction that, when executed by the at least one processor, causes the at least one processor to operate the light-emitting element in response to an input, to acquire an image using the light-receiving element when or immediately after the light-emitting element operates, and to compare the acquired image with a pre-stored reference image.

According to various example embodiments of the present disclosure, it is possible to obstruct light in a specified wavelength range through a visible-light-absorbing member without loss of light transmittance.

Furthermore, according to various example embodiments of the present disclosure, by using a lens to which a visible-light absorbing material is applied, it is possible to adjust the beam angle of an IR LED and obstruct visible light with one lens, thereby reducing the size of an optical module and an electronic device having the same.

In addition, the present disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
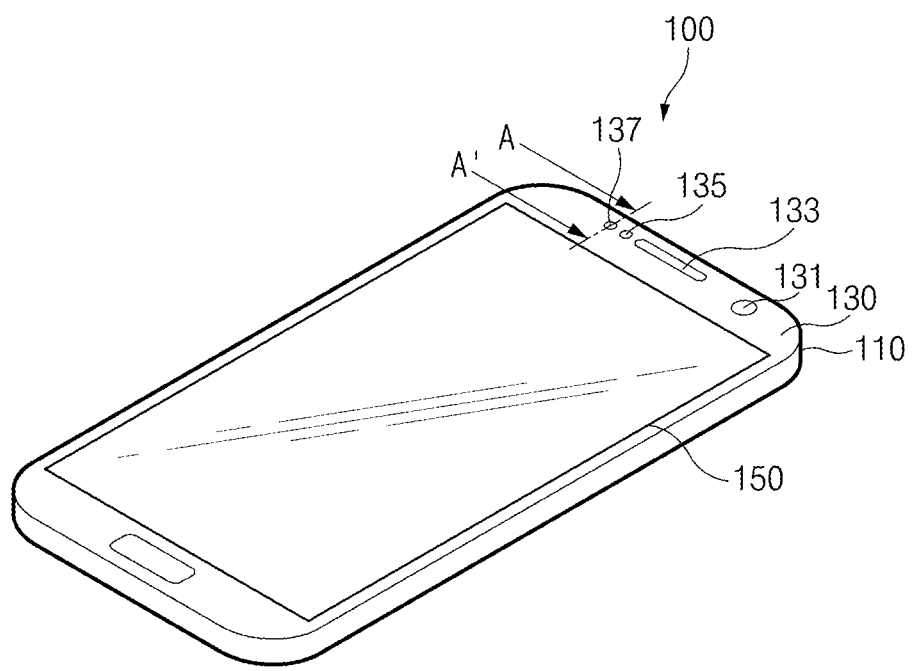
FIG. 1 is a perspective view of an example electronic device having an optical module according to an example embodiment.

Hereinafter, various example embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The terms and words used in the following description and claims are not limited to the bibliographical meanings, but, are merely used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may refer, for example, and without limitation, to a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit), or the like, but is not limited thereto.

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic picture frame, or the like, but is not limited thereto.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like), or the like, but is not limited thereto.

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like), or the like, but is not limited thereto. An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 is a perspective view illustrating an example electronic device having an optical module according to an example embodiment.

According to various embodiments, an electronic device 100 may include an IR sensor. The IR sensor may irradiate light in the infrared wavelength range and may receive the light reflected from an object to sense the proximity of the object, measure ambient illuminance, or determine the shape of the object. The IR sensor may include, for example, a proximity sensor, an illuminance sensor, or an iris sensor. The IR sensor may be included in a depth camera provided in the package.

The IR sensor may use light in the near-infrared region (e.g., 810 to 850 nm). However, the wavelength range of light emitted by an IR LED corresponding to a light-emitting unit of the IR sensor may include a region (e.g., 700 to 780 nm) in the visible wavelength range, and thus visible light emitted by the IR LED may be exposed to the outside. For the purpose of preventing and/or reducing the visible light from being exposed to the outside, the electronic device 100 may include a visible-light-absorbing member disposed above the IR sensor, or may include an IR sensor that includes a lens having a visible-light-absorbing member applied thereto.

Referring to FIG. 1, the above-described electronic device 100 may include a housing 110, a cover window 130, and a display 150. The housing 110 may hold and support elements of the electronic device 100. According to an embodiment, the housing 110 may have space in which the display 150 is seated, and may hold the display 150. The housing 110 may include a front surface, a rear surface, and a side surface surrounding at least part of the space between the front and rear surfaces.

The cover window 130 may be formed on at least one outer surface of the housing 110. For example, the cover window 130 may be attached to the front surface of the housing 110. In some embodiments, the cover window 130 may form part of the front surface of the housing 110. For example, the cover window 130 may be included in the housing 110 as the front surface of the housing 110. The cover window 130 may have at least one hole (or opening) formed in one surface thereof. For example, the cover window 130 may have a camera hole 131, a receiver hole 133 (or a speaker hole), a proximity illuminance sensor hole 135, an IR sensor hole 137, or the like formed in the front surface thereof. In the drawing, the camera hole 131 is formed on the upper right side of the front surface of the cover window 130, the receiver hole 133 is formed in the center of the upper side thereof, and the proximity illuminance sensor hole 135 and the IR sensor hole 137 are formed on the upper left side thereof. However, the number and positions of holes formed in the surface of the cover window 130 are not limited thereto. According to various embodiments, at least one hole may be additionally formed in addition to the above-described holes, and at least one of the holes described above may be omitted.

The camera hole 131 may serve as a light passage for a camera disposed inside the housing 110. For example, the camera may be disposed to be aligned with the camera hole 131 and may create an image using light reflected from a subject and input through the camera hole 131. The receiver hole 133 (or the speaker hole) may serve as a sound passage for a receiver (or a speaker) disposed inside the housing 110. For example, the receiver may output a counterpart's speech during a call, and the output speech may travel to the outside through the receiver hole 133. The proximity illuminance sensor hole 135 may serve as a light passage for a proximity illuminance sensor disposed inside the housing 110. For example, the proximity illuminance sensor hole 135 may serve as a passage for light emitted from the proximity illuminance sensor and as a passage for light input to the proximity illuminance sensor. The IR sensor hole 137 may serve as a light passage for an IR sensor disposed inside the housing 110. For example, the IR sensor hole 137 may serve as a passage for light emitted from the IR sensor and as a passage for light input to the IR sensor.

According to various embodiments, the proximity illuminance sensor hole 135 and the IR sensor hole 137 may be formed to be spaced apart from each other by a specified distance or less. For example, the proximity illuminance sensor hole 135 and the IR sensor hole 137 may be formed to be spaced apart from each other by a distance of 15 mm or less. Accordingly, the proximity illuminance sensor aligned with the proximity illuminance sensor hole 135 and the IR sensor aligned with the IR sensor hole 137 may be located with the specified distance (e.g., 15 mm) or less therebetween. Since the proximity illuminance sensor and the IR sensor are located with the specified distance or less therebetween, when a part of a user's body (e.g., the face) approaches the IR sensor, the proximity illuminance sensor may sense the approach to the IR sensor and may deactivate the IR sensor. This serves to prevent and/or reduce light emitted from the IR sensor from being excessively input to the user's eyes when the user allows his/her face to approach too close to the IR sensor for iris recognition.

The display 150 may display various types of content (e.g., text, images, videos, icons, symbols, or the like) to a user. The display 150 may include a touch screen and may receive touch, gesture, proximity, or hovering input using an electronic pen or a part of a user's body.

The display 150 may be seated inside the housing 110. The cover window 130 may be disposed on the display 150. For example, the cover window 130 may be fastened to one surface (e.g., the front surface) of the housing 110 to cover the display 150. At least one region of the cover window 130 may be formed of a transparent material (e.g., glass), and a screen output on the display 150 may be displayed to the outside through the transparent region of the cover window 130.

Figure 2:
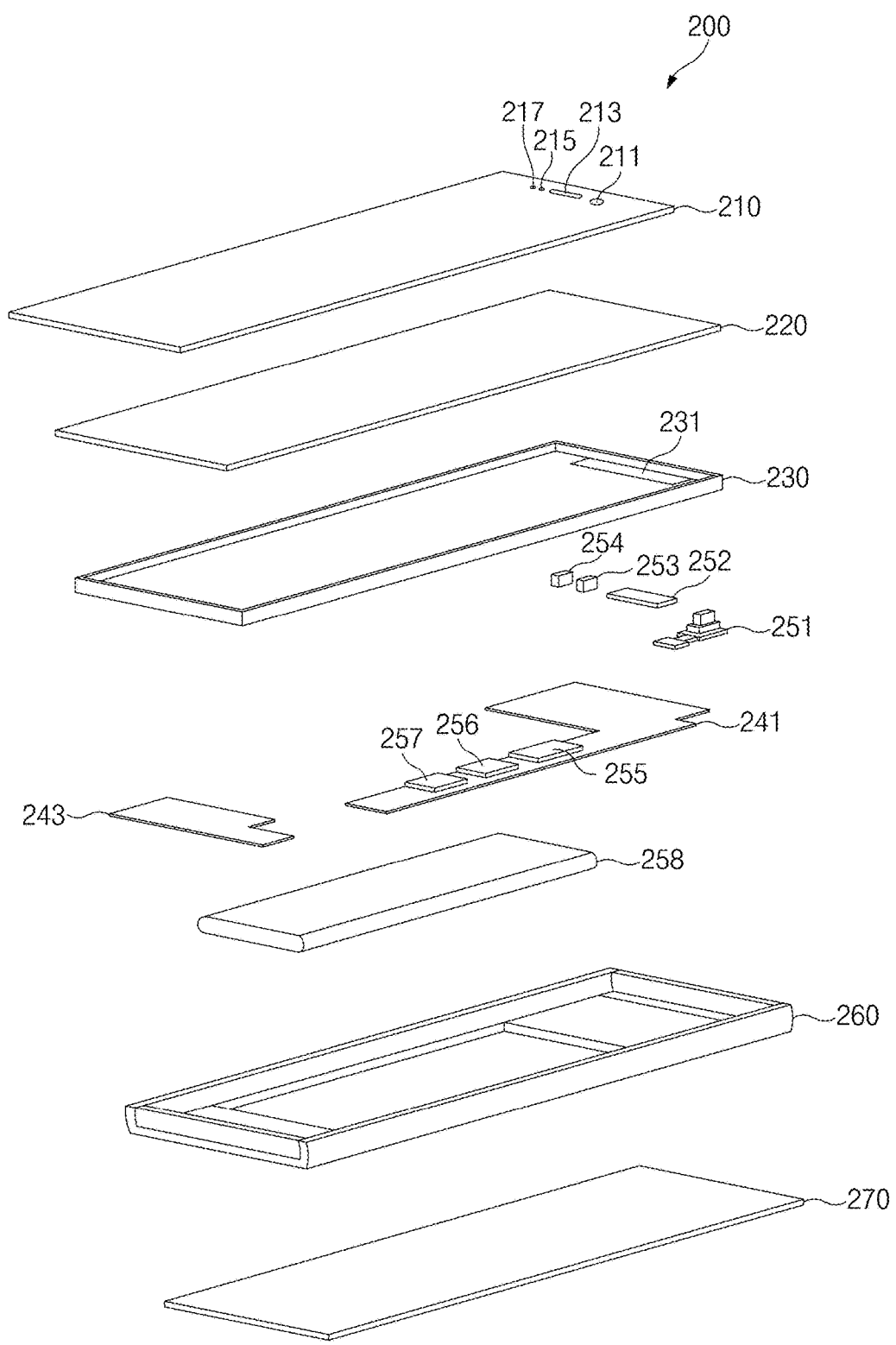
FIG. 2 is an exploded perspective view of an example electronic device according to an example embodiment.

FIG. 2 is an exploded perspective view illustrating an example electronic device according to an example embodiment.

Referring to FIG. 2, an electronic device 200 may include a cover window 210, a display 220, a bracket 230, printed circuit boards (e.g., a first printed circuit board 241 and a second printed circuit board 243), a housing 260, and a rear cover 270. The cover window 210 may form the front side of the electronic device 200. The cover window 210 may be disposed on the display 220 to cover the display 220. At least one region of the cover window 210 may be formed of a transparent material, and a screen output on the display 220 may be displayed to the outside through the transparent region of the cover window 210.

The cover window 210 may include at least one hole (or opening). For example, the cover window 210 may include a camera hole 211, a receiver hole 213 (e.g., a speaker hole), a proximity illuminance sensor hole 215, and an IR sensor hole 217. The camera hole 211 may serve as a light passage for a camera 251 seated inside the housing 260. The camera hole 211 may be formed to be aligned with the position where the camera 251 is seated. The receiver hole 213 (or the speaker hole) may serve as a sound passage for a receiver 252 (or a speaker) seated inside the housing 260. The receiver hole 213 may be formed to be connected with the space in which the receiver 252 is seated. The proximity illuminance sensor hole 215 may serve as a light passage for a proximity illuminance sensor 253 seated inside the housing 260. The proximity illuminance sensor hole 215 may be formed to be aligned with the position where the proximity illuminance sensor 253 is seated. The IR sensor hole 217 may serve as a light passage for an IR sensor 254 seated inside the housing 260. The IR sensor hole 217 may be formed to be aligned with the position where the IR sensor 254 is seated. The IR sensor hole 217 may be divided into a hole for a light-emitting unit of the IR sensor 254 and a hole for a light-receiving unit of the IR sensor 254, or these holes may be integrated with each other. According to various embodiments, the proximity illuminance sensor hole 215 and the IR sensor hole 217 may be formed to be spaced apart from each other by a specified distance or less. For example, the proximity illuminance sensor hole 215 and the IR sensor hole 217 may be formed to be spaced apart from each other by a distance of 15 mm or less.

According to various embodiments, the cover window 210 may include a visible-light-absorbing member (not shown in FIG. 2). For example, the cover window 210 may include a visible-light-absorbing member disposed on the surface thereof that faces the IR sensor 254 and aligned with the IR sensor hole 217. The visible-light-absorbing member may absorb light in a specified wavelength range (e.g., 700 to 780 nm). For example, the visible-light-absorbing member may be formed of plastic (e.g., polycarbonate). In another example, the visible-light-absorbing member may be formed of cycloolefin, cycloolefin polymer (COP), cycloolefin copolymer (COC), or the like. The visible-light-absorbing member may be formed of, for example, panlite L-1225R or panlite L-1225L of Teijin Chemicals Ltd., FBK-80 of Arton Co., Ltd., or the like, but is not limited thereto.

According to an embodiment, the visible-light-absorbing member may have a refractive index ranging from 1.45 to 1.68. However, the refractive index of the visible-light-absorbing member is not limited thereto. The aforementioned refractive index may correspond to the case where incident light has a wavelength of 852.1 nm, and when the wavelength of light changes, the refractive index may also be varied within a specified error range. A detailed description of the arrangement of the visible-light-absorbing member will be given in conjunction with example embodiments which will be described in greater detail below.

The display 220 may include, for example, a liquid crystal display (LCD), a light-emitting diode (LED) display, an organic LED (OLED) display, a microelectromechanical systems (MEMS) display, or an electronic paper display, or the like, but is not limited thereto. The display 220 may display various types of content (e.g., text, images, videos, icons, symbols, or the like) to a user.

The bracket 230 may include an insulating material and may have space in which the display 220 is seated. According to an embodiment, the bracket 230 may include an adhesive material or an adhesive layer on some regions thereof to permit the display 220 to be secured to the bracket 230. According to various embodiments, the bracket 230 may include at least one opening 231. According to an embodiment, through the at least one opening 231 formed in the bracket 230, some elements of the electronic device 200 may be aligned with at least one hole formed in the cover window 210. For example, through the at least one opening formed in the bracket 230, the camera 251, the receiver 252, the proximity illuminance sensor 253, and the IR sensor 254 may be aligned with the camera hole 211, the receiver hole 213, the proximity illuminance sensor hole 215, and the IR sensor hole 217 of the cover window 210, respectively.

The printed circuit boards (e.g., the first and second printed circuit boards 241 and 243 may be disposed below the bracket 230. Various types of electronic components may be mounted on the printed circuit boards. For example, at least one electronic element, circuit line, or the like may be mounted on the printed circuit boards, and at least some of the electronic components may be electrically connected with one another. The electronic components may include, for example, and without limitation, a processor (e.g., including processing circuitry) 255, memory 256, a communication module (e.g., including communication circuitry) 257, functional modules (e.g., the camera 251, receiver 252, the proximity illuminance sensor 253, and the IR sensor 254), or the like.

The processor 255 may include various processing circuitry and perform operations or data processing associated with control and/or communication of at least one other element of the electronic device 200. The processor 255 may drive, for example, an operating system or an application program to control a plurality of hardware or software elements connected to the processor 255 and to perform various types of data processing or operations. The processor 255 may include various processing circuitry, such as, for example, and without limitation, one or more of a dedicated processor, a central processing unit, an application processor (AP), and a communication processor (CP). The processor 255 may be implemented with a system on chip (SoC).

The memory 256 may include volatile and/or non-volatile memory. For example, the memory 256 may store instructions or data associated with at least one other element of the electronic device 200. According to an embodiment, the memory 256 may store software and/or programs.

The communication module 257 may configure communication between the electronic device 200 and an external device. For example, the communication module 257 may be connected to a network through wireless communication or wired communication to communicate with the external device. The communication module 257 may include various communication circuitry, such as, for example, and without limitation, at least one of a cellular module, a Wi-Fi module, a Bluetooth (BT) module, a GNSS module (e.g., a GPS module, a Glonass module, a Beidou module, or a Galileo module), an NFC module, and a radio frequency (RF) module.

The functional modules may perform at least one of functions provided by the electronic device 200. For example, the functional modules may include the camera 251 that performs a photographing function, the receiver 252 (or the speaker) that outputs sounds, the proximity illuminance sensor 253 that senses the proximity of an object or ambient illuminance, the IR sensor 254 that identifies a user's iris, or the like.

According to various embodiments, the printed circuit boards may be integrated with each other, or a plurality of printed circuit boards may be provided. In the drawing, the first printed circuit board 241 and the second printed circuit board 243 are illustrated. According to an embodiment, the first and second printed circuit boards 241 and 243 may be electrically connected with each other.

The housing 260 may hold and support the elements of the electronic device 200. According to an embodiment, the display 220, the bracket 230, and the printed circuit boards stacked one above another in sequence may be seated on the housing 260. Furthermore, at least one of the functional modules may be seated on the housing 260 and secured to the same.

The housing 260 may include a front surface, a rear surface, and a side surface surrounding at least part of the space between the front and rear surfaces. According to an embodiment, the housing 260 may have an opening formed through the front and rear surfaces thereof to permit a battery 258 to be attached to and detached from the housing 260, but the present disclosure is not limited thereto. In some embodiments, the battery 258 may be integrated with the electronic device 200, and thus the housing 260 may have no opening formed through the front and rear surfaces thereof.

The battery 258 may supply electric power to the elements included in the electronic device 200. For example, the battery 258 may be electrically connected with the printed circuit boards to supply electric power to the electronic components mounted on the printed circuit boards.

The rear cover 270 may form the rear side of the electronic device 200. For example, the rear cover 270 may be fastened to one surface (e.g., the rear surface) of the housing 260 to cover the rear surface of the housing 260. According to various embodiments, the rear cover 270 may be attached to and detached from the housing 260.

Figure 3:
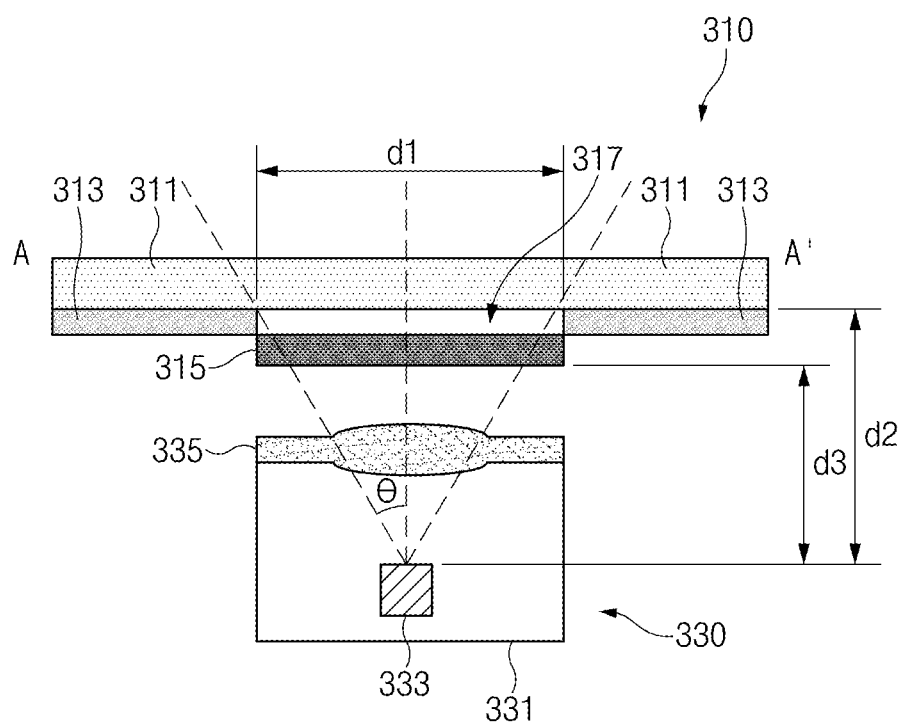
FIG. 3 is a fragmentary sectional view illustrating an example visible-light-absorbing member according to an example embodiment, taken along line A-A' of FIG. 1.
Figure 4:
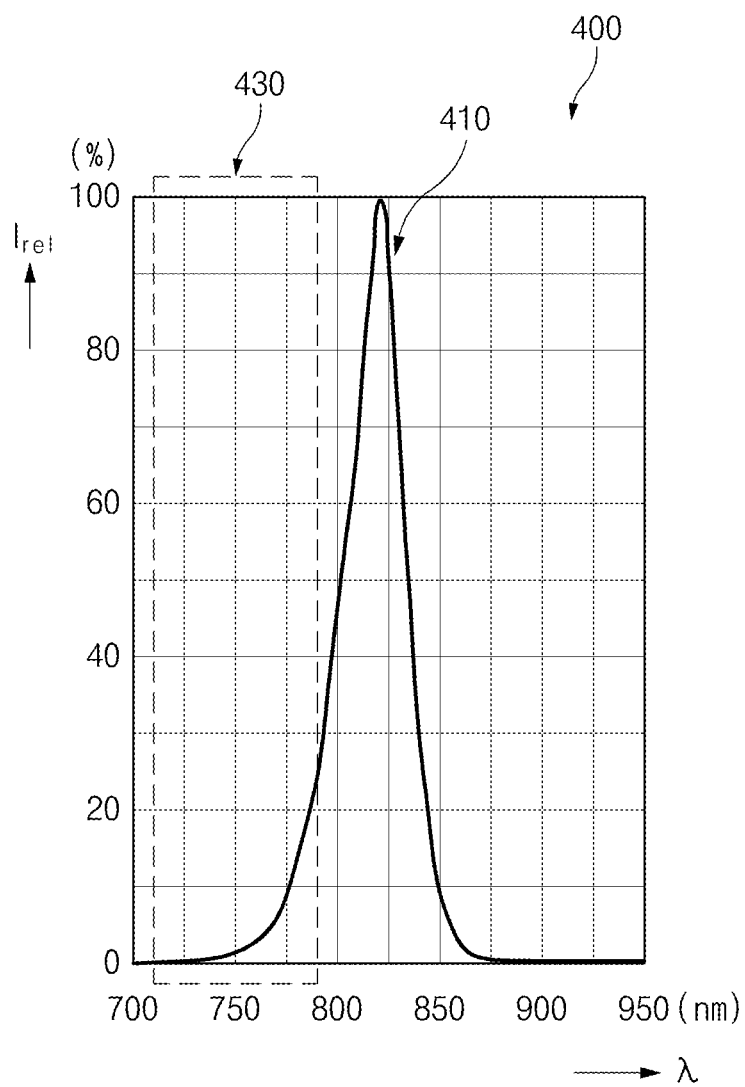
FIG. 4 illustrates an example frequency band of light used by an IR sensor according to an example embodiment.

FIG. 3 is a fragmentary sectional view illustrating an example visible-light-absorbing member according to an example embodiment. FIG. 3 is a fragmentary sectional view taken along line A-A' of FIG. 1. FIG. 4 illustrates an example frequency band of light used by an IR sensor according to an example embodiment.

Referring to FIG. 3, an electronic device (e.g., the electronic device 100) may include a cover window 310 and an IR sensor 330. The cover window 310 may include a glass layer 311, a film layer 313, and a visible-light-absorbing member 315. The glass layer 311, the film layer 313, and the visible-light-absorbing member 315 may be stacked one above another in sequence. The glass layer 311 may be formed, for example, on the exterior of the electronic device and may serve to protect the electronic device from an external shock. The glass layer 311 may be formed of a transparent material (e.g., glass).

The film layer 313 may include a film on which letters, numbers, symbols, figures, or the like are printed using opaque color ink (or paint). According to an embodiment, the film layer 313 may implement a specific pattern or design. For example, a molded pattern may be formed on the film layer 313 by UV molding. The film layer 313 may include a coating film opaquely printed thereon to prevent the non-active area adjacent to the active area of a display (e.g., the display 150) from being exposed to the outside. For example, the film layer 313 may not be formed in a region of the cover window 310, for example, in the region of an IR sensor hole (e.g., the IR sensor hole 137). For example, the film layer 313 may have an opening 317 formed in the IR sensor hole region.

The visible-light-absorbing member 315 may absorb light in a specified wavelength range (e.g., 700 to 780 nm). For example, and without limitation, the visible-light-absorbing member 315 may be formed of plastic (e.g., polycarbonate). In another non-limiting example, the visible-light-absorbing member 315 may be formed of cycloolefin, cycloolefin polymer, cycloolefin copolymer, or the like. The visible-light-absorbing member 315 may be formed of, for example, and without limitation, panlite L-1225R or panlite L-1225L of Teijin Chemicals Ltd., FBK-80 of Arton Co., Ltd., or the like. According to an embodiment, the visible-light-absorbing member 315 may, for example, and without limitation, have a refractive index ranging from 1.45 to 1.68. However, the refractive index of the visible-light-absorbing member is not limited thereto. The aforementioned refractive index may correspond to the case where incident light has a wavelength of 852.1 nm, and when the wavelength of light changes, the refractive index may also be varied within a specified error range.

The visible-light-absorbing member 315 may be aligned with the opening 317 formed in the film layer 313. For example, the visible-light-absorbing member 315 may be attached to the rear (or bottom) surface of the film layer 313 to cover the opening formed in the film layer 313. In another example, the visible-light-absorbing member 315 may be inserted into the opening 317 formed in the film layer 313 and may be attached to the rear (or bottom) surface of the glass layer 311.

The IR sensor 330 may be disposed below the cover window 310. For example, the IR sensor 330 may be aligned with the opening 317 formed in the film layer 313. The IR sensor 330 may include a case 331, an IR sensor unit (e.g., including IR sensing circuitry) 333, and a lens 335. The case 331 may have space in which the IR sensor unit 333 is seated, and may include a substrate having various types of circuits and terminals mounted thereon to supply electric power to the IR sensor unit 333 and receive a sensing signal from the IR sensor unit 333.

The IR sensor unit 333 may be mounted on the substrate. The IR sensor unit 333 may include at least one of a light-emitting element that irradiates, to a subject, light in a specified wavelength range (e.g., infrared radiation) and a light-receiving element that receives light reflected from the subject. The light-emitting element may include an IR LED. The light-emitting element and the light-receiving element may be disposed on the substrate so as to be adjacent to each other and may be provided in the form of a single package through the case 331. The case 331 may have a shape that surrounds both the light-emitting element and the light-receiving element and may include, at the upper end thereof, an opening that serves as a light passage for the light-emitting element and the light-receiving element. Furthermore, the case 331 may have a partition wall between the light-emitting element and the light-receiving element to prevent light generated by the light-emitting element from being directly transmitted to the light-receiving element. In some embodiments, the IR sensor 330 may not include the case 331.

The lens 335 may be disposed above at least one of the light-emitting element and the light-receiving element. For example, the lens 335 may be disposed to cover part of the upper end of the case 331. The lens 335 may be formed of a transparent or translucent material, which may be, for example, and without limitation, silicone, epoxy, acryl, glass, sapphire, or the like. In addition, the lens 335 may be formed of various types of transparent or translucent materials, such as various types of transparent encapsulation materials, transparent electrode materials, transparent insulating materials, or the like. In some embodiments, the lens 335 may be formed of a visible-light-absorbing material. According to an embodiment, the lens 335 may have a spherical surface on at least one side thereof. For example, the lens 335 may have a convex shape.

According to an embodiment, the dimension d1 of the opening 317 formed in the cover window 310 may be differently set depending on the distance d2 from the upper end of the IR sensor unit 333 to the opening 317 and the angle of view θ of the IR sensor unit 333. According to an embodiment, when the distance d2 from the upper end of the IR sensor unit 333 to the opening 317 is 4 mm, the dimension d1 of the opening 317 may be 13.8 mm or more if the angle of view θ of the IR sensor unit 333 is 60°, and may be 2.14 mm or more if the angle of view θ of the IR sensor unit 333 is 15°. In another example, when the angle of view θ of the IR sensor unit 333 is 15°, the dimension d1 of the opening 317 may be 2.14 mm or more if the distance d2 from the upper end of the IR sensor unit 333 to the opening 317 is 4 mm, and may be 1.61 mm or more if the distance d2 from the upper end of the IR sensor unit 333 to the opening 317 is 3 mm. Considering the above-described relationships and the thickness of the electronic device, it is preferred that the visible-light-absorbing member 315 be disposed such that the distance d3 from the upper end of the IR sensor unit 333 to the lower end of the visible-light-absorbing member 315 is equal to or less than 8 mm.

FIG. 4 is a graph 400 illustrating an example frequency band of light 410 used by the IR sensor unit 333. The IR sensor unit 333 may use light in the near-infrared region (e.g., 810 to 850 nm). However, the wavelength range of light emitted by the IR LED included in the IR sensor unit 333 may include a region 430 (e.g., 700 to 780 nm) in the visible wavelength range, as illustrated in the graph 400, and thus visible light emitted by the IR LED may be exposed to the outside. The electronic device may include the visible-light-absorbing member 315 to prevent and/or reduce the visible light from being exposed to the outside. As described above, the visible-light-absorbing member 315 may absorb light in a specified wavelength range (e.g., 700 to 780 nm) and may thus prevent and/or reduce the visible light from being exposed to the outside. Accordingly, the visibility of the IR sensor hole (e.g., the opening 317) may be reduced. Furthermore, the visible-light-absorbing member 315 may allow light in the infrared wavelength range (e.g., 810 to 940 nm) to pass through the visible-light-absorbing member 315. As a result, infrared radiation may be incident on the IR sensor unit 333, or may be released from the IR sensor unit 333, through the visible-light-absorbing member 315.

Figure 5:
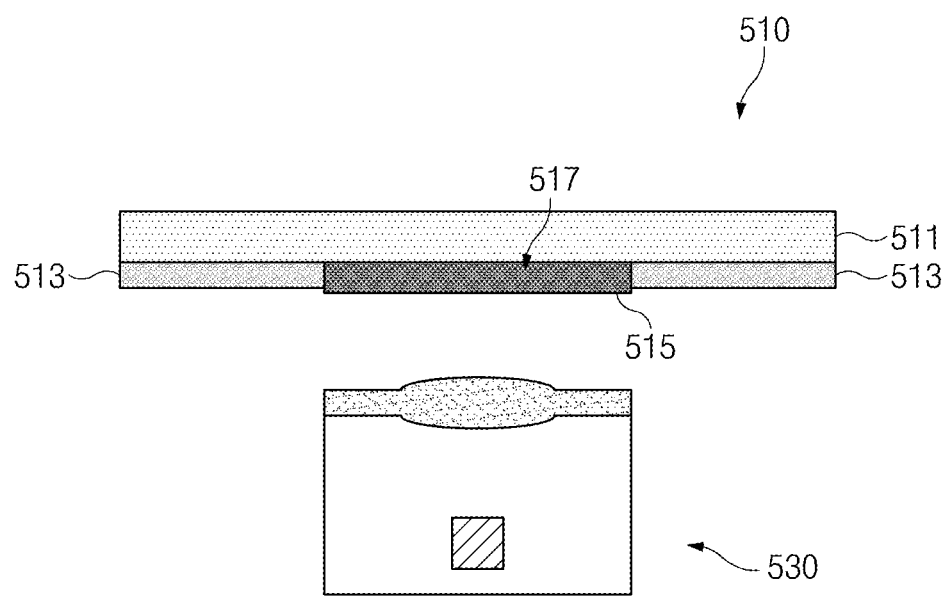
FIG. 5 is a sectional view illustrating an example visible-light-absorbing member according to another example embodiment.

FIG. 5 is a diagram illustrating an example visible-light-absorbing member according to another example embodiment.

Referring to FIG. 5, a visible-light-absorbing member 515 may be inserted into an IR sensor hole (e.g., an opening 517) formed in a cover window 510. For example, the visible-light-absorbing member 515 may be inserted into the opening 517 that is formed in a film layer 513 disposed under the rear surface of a glass layer 511 of the cover window 510, and may be attached to the rear surface of the glass layer 511.

Since the visible-light-absorbing member 515 is inserted into the opening 517 formed in the film layer 513, the visible-light-absorbing member 515, together with the film layer 513, may be located in the same layer. Since the visible-light-absorbing member 515 and the film layer 513 are located in the same layer, the visible-light-absorbing member 515 may be disposed such that the distance between the IR sensor 530 and the visible-light-absorbing member 515 (the distance between the facing surfaces thereof) is shorter than that in the embodiment illustrated in FIG. 3, and thus the overall thickness of the electronic device (e.g., the electronic device 100) may be reduced. Furthermore, the dimension of the opening 517 formed in the film layer 513 may also be decreased with the reduction in the gap between the IR sensor 530 and the visible-light-absorbing member 515.

Figure 6:
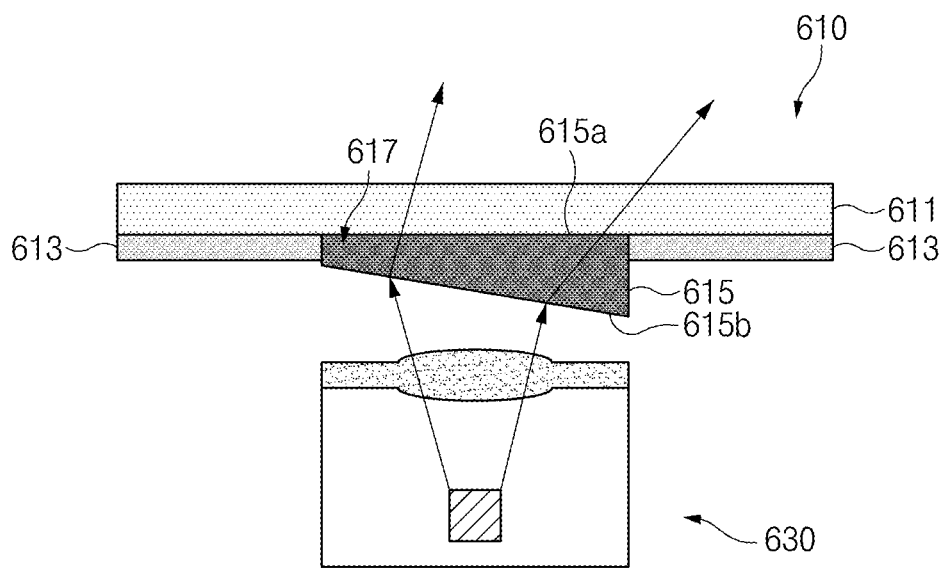
FIG. 6 is a sectional view illustrating an example visible-light-absorbing member according to another example embodiment.

FIG. 6 is a diagram illustrating an example visible-light-absorbing member according to another example embodiment.

Referring to FIG. 6, a visible-light-absorbing member 615 may be inserted into an IR sensor hole (e.g., an opening 617) formed in a cover window 610. For example, the visible-light-absorbing member 615 may be inserted into the opening 617 that is formed in a film layer 613 disposed under the rear surface of a glass layer 611 of the cover window 610, and may be attached to the rear surface of the glass layer 611.

According to an embodiment, the visible-light-absorbing member 615 may adjust the beam angle of light emitted from an IR sensor 630. For example, a surface 615b of the visible-light-absorbing member 615 that faces the IR sensor 630 may be inclined at a specified angle. Accordingly, a surface 615a of the visible-light-absorbing member 615 that faces the glass layer 611 may form the specified angle together with the surface 615b of the visible-light-absorbing member 615 that faces the IR sensor 630. For example, the visible-light-absorbing member 615 may have a wedge shape. The visible-light-absorbing member 615 may adjust the beam angle of light emitted from the IR sensor 630 to thereby adjust the angle at which the light is incident on a user's eyes. This serves to prevent and/or reduce part of the light reaching the periphery of the user's irises (e.g., retinas) from being input to a light-receiving element of the IR sensor 630 after being reflected. As a result, it is possible to increase the rate at which the user's irises are recognized.

Figure 7:
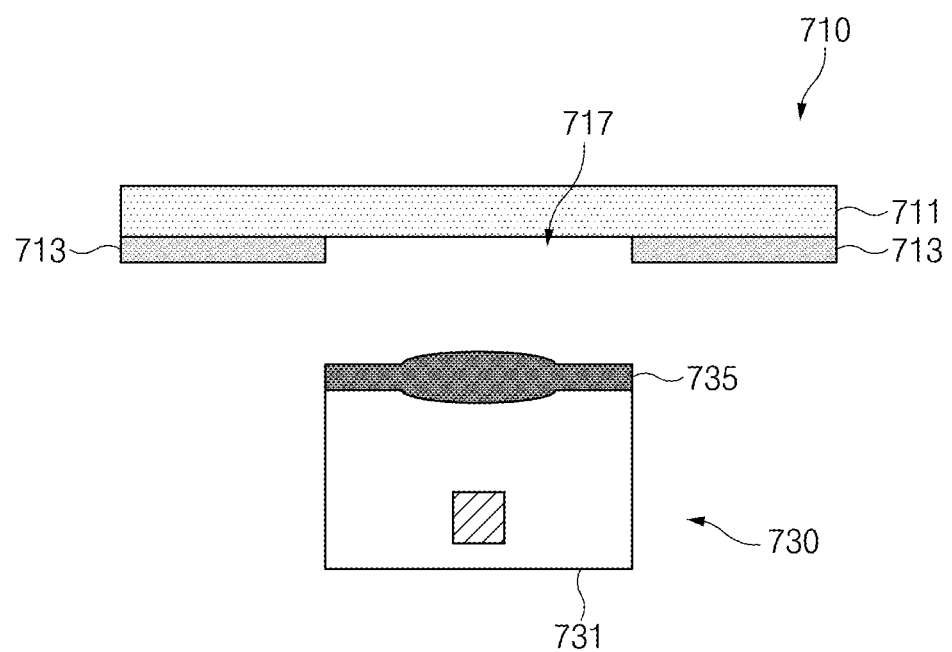
FIG. 7 is a sectional view illustrating an example lens having a visible-light-absorbing material applied thereto according to an example embodiment.

FIG. 7 is a diagram illustrating an example lens having a visible-light-absorbing material applied thereto according to an example embodiment.

Referring to FIG. 7, a visible-light-absorbing material may be applied to a lens 735 included in an IR sensor 730, whereas a cover window 710 may not include a visible-light-absorbing member (e.g., the visible-light-absorbing member 315). For example, the lens 735, which is disposed to cover part of the upper end of a case 731 of the IR sensor 730, may be formed of a visible-light-absorbing material. Due to the use of the lens 735 formed of a visible-light-absorbing material, the cover window 710 may not include a visible-light-absorbing member that is inserted into an opening 717 formed in a film layer 713 and is attached to the rear surface of a glass layer 711. Accordingly, it is possible to adjust the beam angle of light emitted from the IR sensor 730 and obstruct visible light with only the lens 735, thereby reducing the size of the IR sensor 730 and an electronic device including the same.

Figure 8:
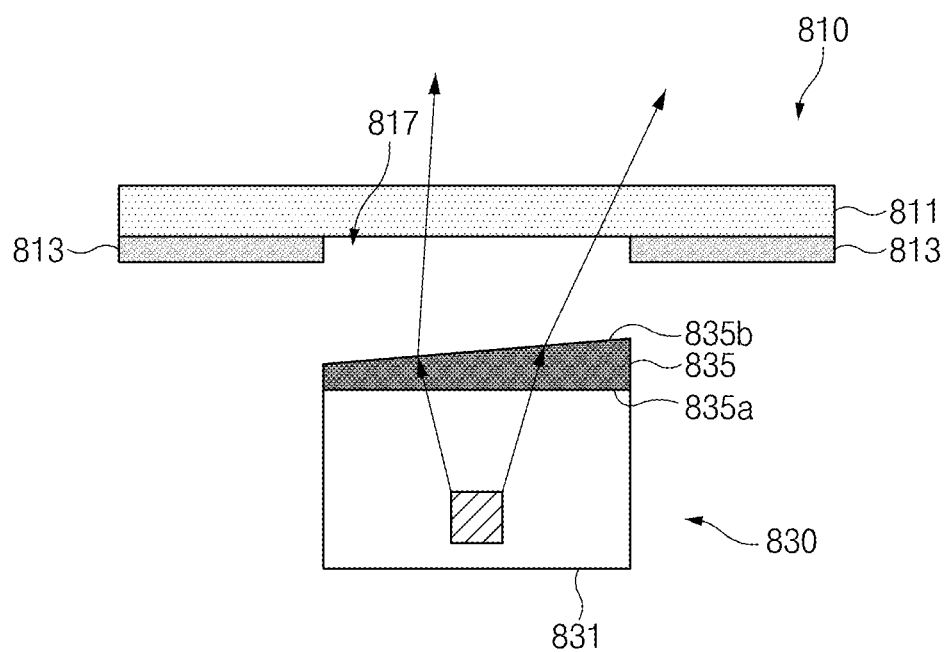
FIG. 8 is a sectional view illustrating an example lens having a visible-light-absorbing material applied thereto according to another example embodiment.
Figure 9:
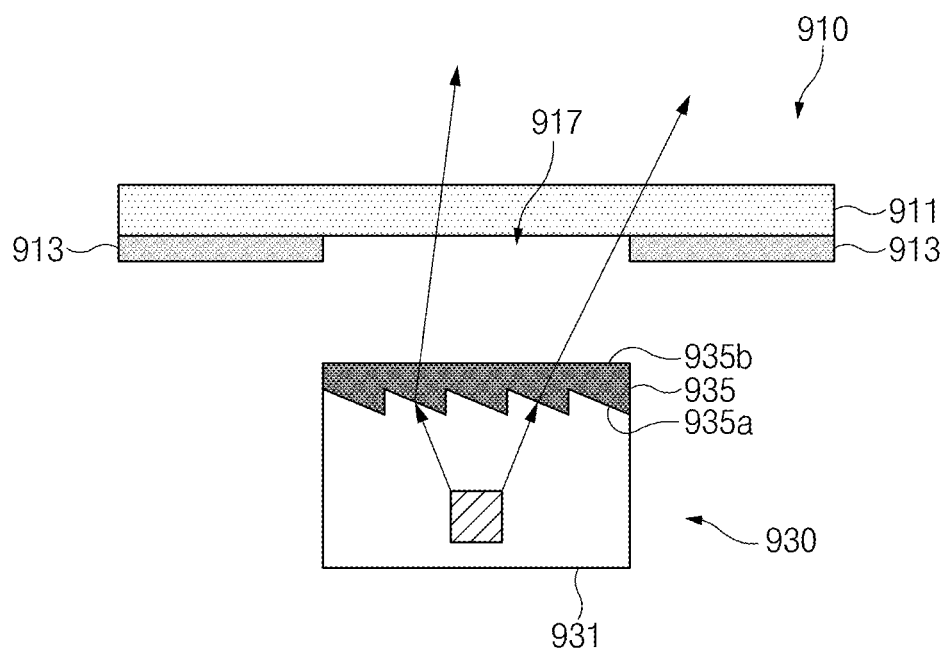
FIG. 9 is a sectional view illustrating an example lens having a visible-light-absorbing material applied thereto according to another example embodiment.

FIG. 8 is a diagram illustrating an example lens having a visible-light-absorbing material applied thereto according to another example embodiment, and FIG. 9 is a diagram illustrating an example lens having a visible-light-absorbing material applied thereto according to another example embodiment.

Referring to FIGS. 8 and 9, cover windows 810 and 910 may include glass layers 811 and 911 forming the exterior of an electronic device (e.g., the electronic device 100) and film layers 813 and 913 attached to the rear surfaces of the glass layers 811 and 911 and having letters, numbers, symbols, figures, specific patterns or designs, or the like printed thereon using opaque color ink (or paint). The film layers 813 and 913 may have openings 817 and 917 that serve as light passages for IR sensors 830 and 930.

The IR sensors 830 and 930 may be aligned with the openings 817 and 917 formed in the film layers 813 and 913. The IR sensors 830 and 930 may include light-emitting elements and light-receiving elements, and at least one of the light-emitting element and the light-receiving element of each IR sensor may be disposed in the corresponding case 831, 931. Lenses 835 and 935 may be disposed to cover part of the upper ends of the cases 831 and 931. The lenses 835 and 935 may adjust the beam angle of light emitted from the IR sensors 830 and 930.

According to an embodiment, the lenses 835 and 935 may be formed of a visible-light-absorbing material to absorb light in a region (e.g., 700 to 780 nm) of the visible wavelength range, and may allow light in a region (e.g., 810 to 940 nm) of the infrared wavelength range to pass through the lenses 835 and 935.

According to an embodiment, the lenses 835 and 935 may have a tilt structure. As illustrated in FIG. 8, the lens 835 may have a surface 835b that faces the opening 817 formed in the cover window 810 and inclines at a specified angle. For example, a surface 835a of the lens 835 that faces the upper end of the case 831 of the IR sensor 830 may form the specified angle together with the surface 835b of the lens 835 that faces the opening 817 formed in the cover window 810. As illustrated in FIG. 9, the lens 935 may have a surface 935a that faces the upper end of the case 931 of the IR sensor 930 and inclines at a specified angle. Accordingly, the surface 935a of the lens 935 that faces the upper end of the case 931 of the IR sensor 930 may form the specified angle together with the surface 935b of the lens 935 that faces the opening 917 formed in the cover window 910.

According to various embodiments, the surface 935a coupled with the upper end of the case 931 of the IR sensor 930 may have a specified pattern. For example, the surface 935a coupled with the upper end of the case 931 of the IR sensor 930 may have a saw-tooth pattern, as illustrated in FIG. 9. However, the shape of the pattern is not limited thereto.

Figure 10:
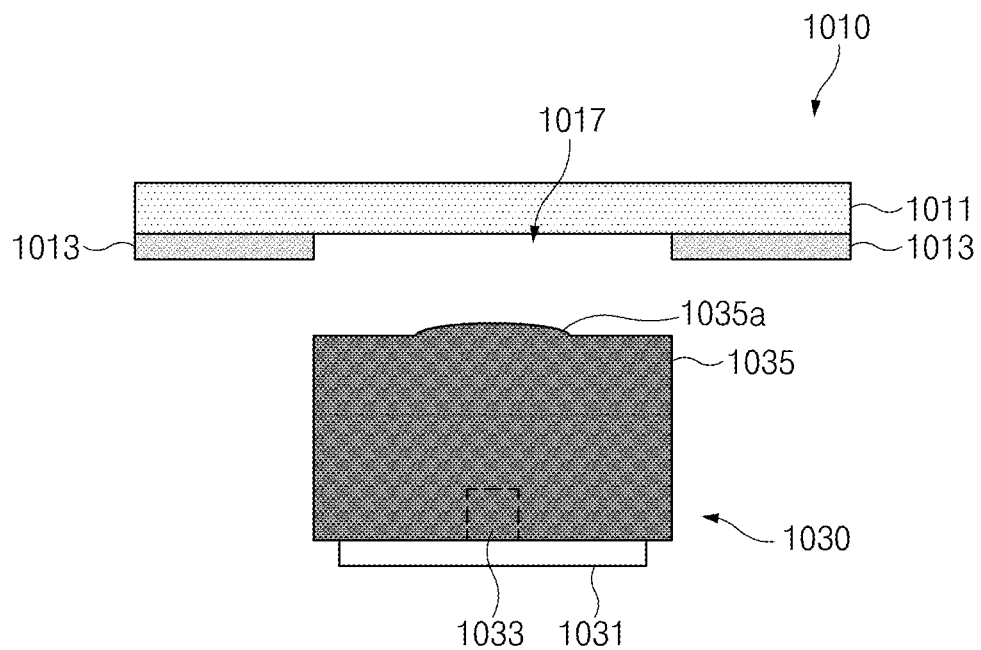
FIG. 10 is a diagram illustrating an example lens having a visible-light-absorbing material applied thereto according to another example embodiment.

FIG. 10 is a diagram illustrating an example lens having a visible-light-absorbing material applied thereto according to another example embodiment.

Referring to FIG. 10, a cover window 1010 may include a glass layer 1011 forming the exterior of an electronic device (e.g., the electronic device 100) and a film layer 1013 attached to the rear surface of the glass layer 1011 and having letters, numbers, symbols, figures, specific patterns or designs, or the like printed thereon using opaque color ink (or paint). The film layer 1013 may have an opening 1017 that serves as a light passage for an IR sensor 1030.

The IR sensor 1030 may be aligned with the opening 1017 formed in the film layer 1013. The IR sensor 1030 may include an IR sensor unit 1033 that includes various IR sensing circuitry, such as, for example, and without limitation, at least one of a light-emitting element and a light-receiving element and is disposed in a case 1031 of the IR sensor 1030. The case 1031 may include a lens 1035 that adjusts the beam angle of light emitted from the IR sensor unit 1033.

According to an embodiment, the lens 1035 may be formed of a visible-light-absorbing material and may be configured to cover the upper end of the case 1031 and part of a side surface thereof. For example, the lens 1035 may have a structure in which a resin (e.g., epoxy) capable of absorbing visible light covers part of the exterior of the case 1031 to seal the IR sensor unit 1033. Furthermore, an upper surface 1035a of the lens 1035 that covers part of the upper end of the case 1031 may be formed in a specified pattern. In FIG. 10, the upper surface 1035a of the lens 1035 is illustrated as protruding toward the opening 1017 formed in the cover window 1010.

Figure 11:
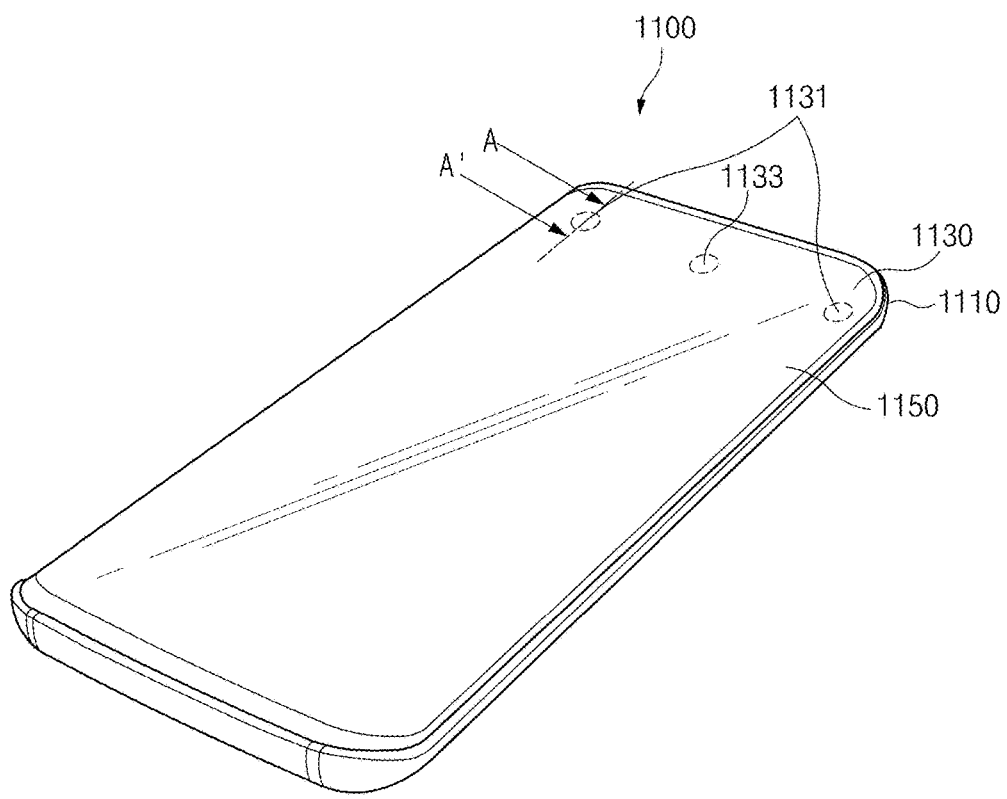
FIG. 11 is a perspective view of an example electronic device, the electronic device including an IR sensor spaced apart from the rear surface of a display according to an example embodiment.

FIG. 11 is a perspective view illustrating an example electronic device according to an example embodiment, wherein the electronic device includes an IR sensor spaced apart from the rear surface of a display.

Referring to FIG. 11, an electronic device 1100 may include a housing 1110, a cover window 1130, and a display 1150. The electronic device 1100 of FIG. 11 may include the same configuration as, or a configuration similar to, that of the electronic device 100 of FIG. 1.

The housing 1110 may hold and support elements of the electronic device 1100. According to an embodiment, the housing 110 may have space in which the display 1150 is seated, and may hold the display 1150. The housing 1110 may include a front surface, a rear surface, and a side surface surrounding at least part of the space between the front and rear surfaces.

The cover window 1130 may be formed on at least one outer surface of the housing 1110. For example, the cover window 1130 may be attached to the front surface of the housing 1110 to cover the display 1150. At least one region of the cover window 1130 may be formed of a transparent material (e.g., glass), and a screen output on the display 1150 may be displayed to the outside through the transparent region of the cover window 1130.

The display 1150 may display various types of content (e.g., text, images, videos, icons, symbols, or the like) to a user. The display 1150 may include a touch screen and may receive touch, gesture, proximity, or hovering input using an electronic pen or a part of a user's body.

According to an embodiment, likewise to a full front display, the display 1150 may occupy almost the entire front surface of the electronic device 1100. Since the active area of the display 1150 occupies almost the entire front surface of the electronic device 1100, the cover window 1130 covering the display 1150 may have a small bezel area, or may have no bezel area. Accordingly, IR sensor holes 1131 and 1133, which are generally formed in the bezel area of the cover window 1130, may be formed in the active area of the display 1150.

Figure 12:
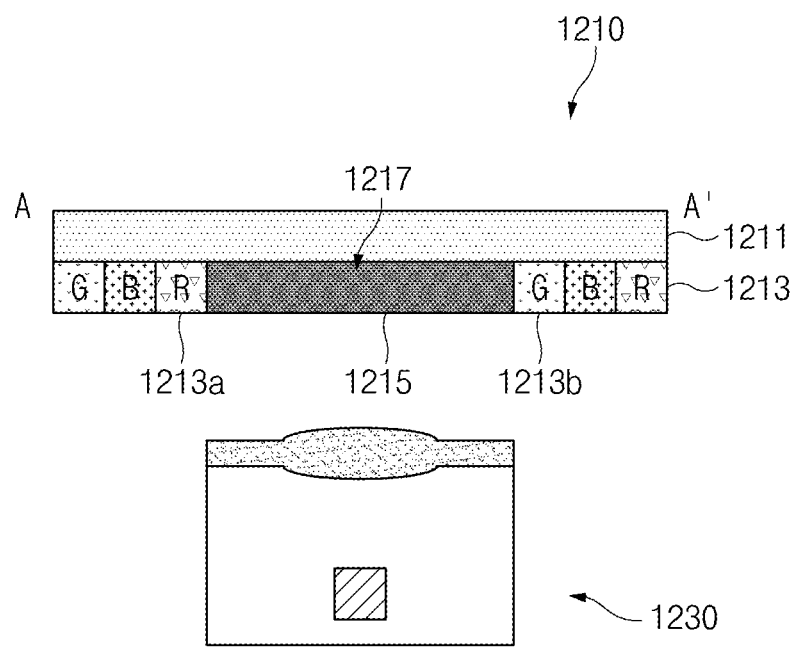
FIG. 12 is a fragmentary sectional view taken along line A-A' of FIG. 11, according to an example embodiment.

FIG. 12 is a fragmentary sectional view taken along line A-A' of FIG. 11, according to an example embodiment.

Referring to FIG. 12, a cover window 1210 may include a glass layer 1211, and a display 1213 may be disposed under the rear surface of the glass layer 1211. The glass layer 1211 may form the exterior of an electronic device (e.g., the electronic device 1100). In some embodiments, the cover window 1210 may further include a film layer attached to the rear surface of the glass layer 1211 and having letters, numbers, symbols, figures, specific patterns or designs, or the like printed thereon using opaque color ink (or paint). Furthermore, the film layer may have an opening that serves as a light passage for an IR sensor 1230.

The display 1213 may be disposed on the rear surface of the glass layer 1211 and may display various types of content. The display 1213 may include a polymer layer, a plurality of display components mounted on one surface of the polymer layer, and at least one conductive line coupled with the polymer layer and electrically connected with the plurality of display component. The polymer layer may be formed of a flexible material such that at least part of the polymer layer is bent toward the rear surface thereof. According to an embodiment, the polymer layer may include polyimide. The plurality of display components may be arranged in a matrix form on one surface of the polymer layer to form pixels (e.g., a first pixel 1213a and a second pixel 1213b) of the display 1213, and may include a fluorescent material, an organic fluorescent material, or the like that is capable of representing colors. The conductive line may include at least one gate signal line or at least one data signal line. According to an embodiment, the plurality of gate signal lines and the plurality of data signal lines may be arranged in a matrix form, and the plurality of display components may be arranged adjacent to the points where the signal lines cross one another and may be electrically connected to the signal lines.

The display 1213 may have an opening 1217 that serves as a light passage for the IR sensor 1230. According to an embodiment, at least one opening 1217 may be formed between the pixels of the display 1213. Since the first and second pixels 1213a and 1213b are spaced apart from each other by a specified distance as in the drawing, the opening 1217 may be formed between the first and second pixels 1213a and 1213b. Although not illustrated, a conductive line connected with the first and second pixels 1213a and 1213b may be disposed to bypass the opening 1217.

A visible-light-absorbing member 1215 may be inserted into the opening 1217 formed in the display 1213. Alternatively, the visible-light-absorbing member 1215 may be attached to the rear surface of the display 1213, or may be included in the display 1213, to cover the opening 1217. The visible-light-absorbing member 1215 may absorb light in a region (e.g., 700 to 780 nm) of the visible wavelength range and may allow light in a region (e.g., 810 to 940 nm) of the infrared wavelength range to pass through the visible-light-absorbing member 1215.

Figure 13:
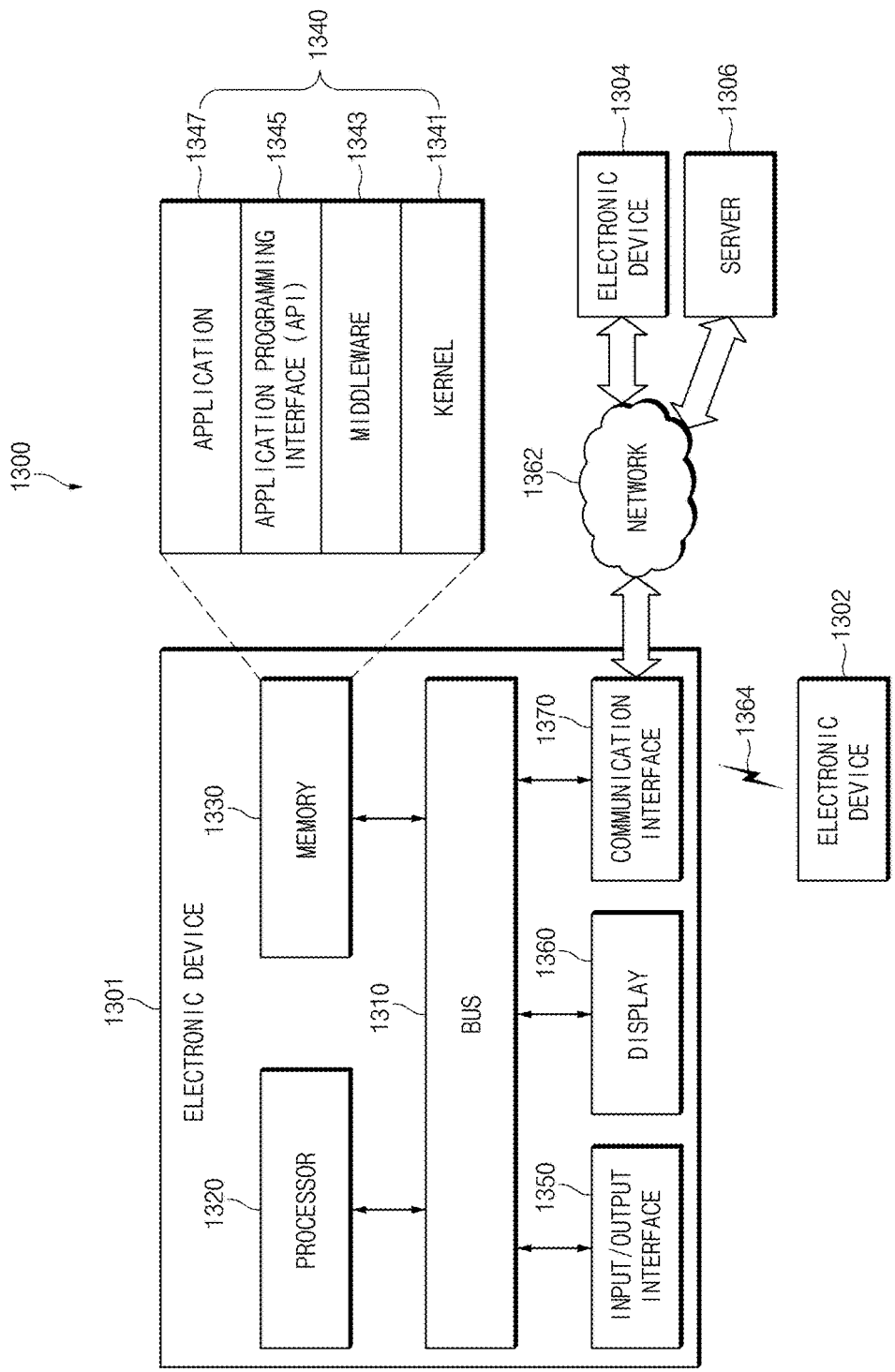
FIG. 13 is a diagram illustrating an example electronic device in a network environment according to an example embodiment of the present disclosure.

FIG. 13 is a diagram illustrating an example electronic device in a network environment according to an example embodiment of the present disclosure.

An electronic device 1301 in a network environment 1300 according to various embodiments of the present disclosure will be described with reference to FIG. 13. The electronic device 1301 may include a bus 1310, a processor (e.g., including processing circuitry) 1320, a memory 1330, an input/output interface (e.g., including input/output circuitry) 1350, a display 1360, and a communication interface (e.g., including communication circuitry) 1370. In various embodiments of the present disclosure, at least one of the foregoing elements may be omitted or another element may be added to the electronic device 1301.

The bus 1310 may include a circuit for connecting the above-mentioned elements 1310 to 1370 to each other and transferring communications (e.g., control messages and/or data) among the above-mentioned elements.

The processor 1320 may include various processing circuitry, such as, for example, and without limitation, at least one of a dedicated processor, a central processing unit (CPU), an application processor (AP), or a communication processor (CP). The processor 1320 may perform data processing or an operation related to communication and/or control of at least one of the other elements of the electronic device 1301.

The memory 1330 may include a volatile memory and/or a nonvolatile memory. The memory 1330 may store instructions or data related to at least one of the other elements of the electronic device 1301. According to an embodiment of the present disclosure, the memory 1330 may store software and/or a program 1340. The program 1340 may include, for example, a kernel 1341, a middleware 1343, an application programming interface (API) 1345, and/or an application program (or an application) 1347. At least a portion of the kernel 1341, the middleware 1343, or the API 1345 may be referred to as an operating system (OS).

The kernel 1341 may control or manage system resources (e.g., the bus 1310, the processor 1320, the memory 1330, or the like) used to perform operations or functions of other programs (e.g., the middleware 1343, the API 1345, or the application program 1347). Furthermore, the kernel 1341 may provide an interface for allowing the middleware 1343, the API 1345, or the application program 1347 to access individual elements of the electronic device 1301 in order to control or manage the system resources.

The middleware 1343 may serve as an intermediary so that the API 1345 or the application program 1347 communicates and exchanges data with the kernel 1341.

Furthermore, the middleware 1343 may handle one or more task requests received from the application program 1347 according to a priority order. For example, the middleware 1343 may assign at least one application program 1347 a priority for using the system resources (e.g., the bus 1310, the processor 1320, the memory 1330, or the like) of the electronic device 1301. For example, the middleware 1343 may handle the one or more task requests according to the priority assigned to the at least one application, thereby performing scheduling or load balancing with respect to the one or more task requests.

The API 1345, which is an interface for allowing the application 1347 to control a function provided by the kernel 1341 or the middleware 1343, may include, for example, at least one interface or function (e.g., instructions) for file control, window control, image processing, character control, or the like.

The input/output interface 1350 may include various input/output circuitry and serve to transfer an instruction or data input from a user or another external device to (an)other element(s) of the electronic device 1301. Furthermore, the input/output interface 1350 may output instructions or data received from (an)other element(s) of the electronic device 1301 to the user or another external device.

The display 1360 may include, for example, a liquid crystal display (LCD), a light-emitting diode (LED) display, an organic light-emitting diode (OLED) display, a micro-electromechanical systems (MEMS) display, or an electronic paper display, or the like, but is not limited thereto. The display 1360 may present various content (e.g., a text, an image, a video, an icon, a symbol, or the like) to the user. The display 1360 may include a touch screen, and may receive a touch, gesture, proximity or hovering input from an electronic pen or a part of a body of the user.

The communication interface 1370 may include various communication circuitry and set communications between the electronic device 1301 and an external device (e.g., a first external electronic device 1302, a second external electronic device 1304, or a server 1306). For example, the communication interface 1370 may be connected to a network 1362 via wireless communications or wired communications so as to communicate with the external device (e.g., the second external electronic device 1304 or the server 1306).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 1364. The short-range communications may include at least one of wireless fidelity (Wi-Fi), Bluetooth, near field communication (NFC), magnetic stripe transmission (MST), or GNSS.

The MST may generate pulses according to transmission data and the pulses may generate electromagnetic signals. The electronic device 1301 may transmit the electromagnetic signals to a reader device such as a POS (point of sales) device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 1362 may include at least one of telecommunications networks, for example, a computer network (e.g., local area network (LAN) or wide area network (WAN)), the Internet, or a telephone network.

The types of the first external electronic device 1302 and the second external electronic device 1304 may be the same as or different from the type of the electronic device 1301. According to an embodiment of the present disclosure, the server 1306 may include a group of one or more servers. A portion or all of operations performed in the electronic device 1301 may be performed in one or more other electronic devices (e.g., the first electronic device 1302, the second external electronic device 1304, or the server 1306). When the electronic device 1301 should perform a certain function or service automatically or in response to a request, the electronic device 1301 may request at least a portion of functions related to the function or service from another device (e.g., the first electronic device 1302, the second external electronic device 1304, or the server 1306) instead of or in addition to performing the function or service for itself. The other electronic device (e.g., the first electronic device 1302, the second external electronic device 1304, or the server 1306) may perform the requested function or additional function, and may transfer a result of the performance to the electronic device 1301. The electronic device 1301 may use a received result itself or additionally process the received result to provide the requested function or service. To this end, for example, a cloud computing technology, a distributed computing technology, or a client-server computing technology may be used.

Figure 14:
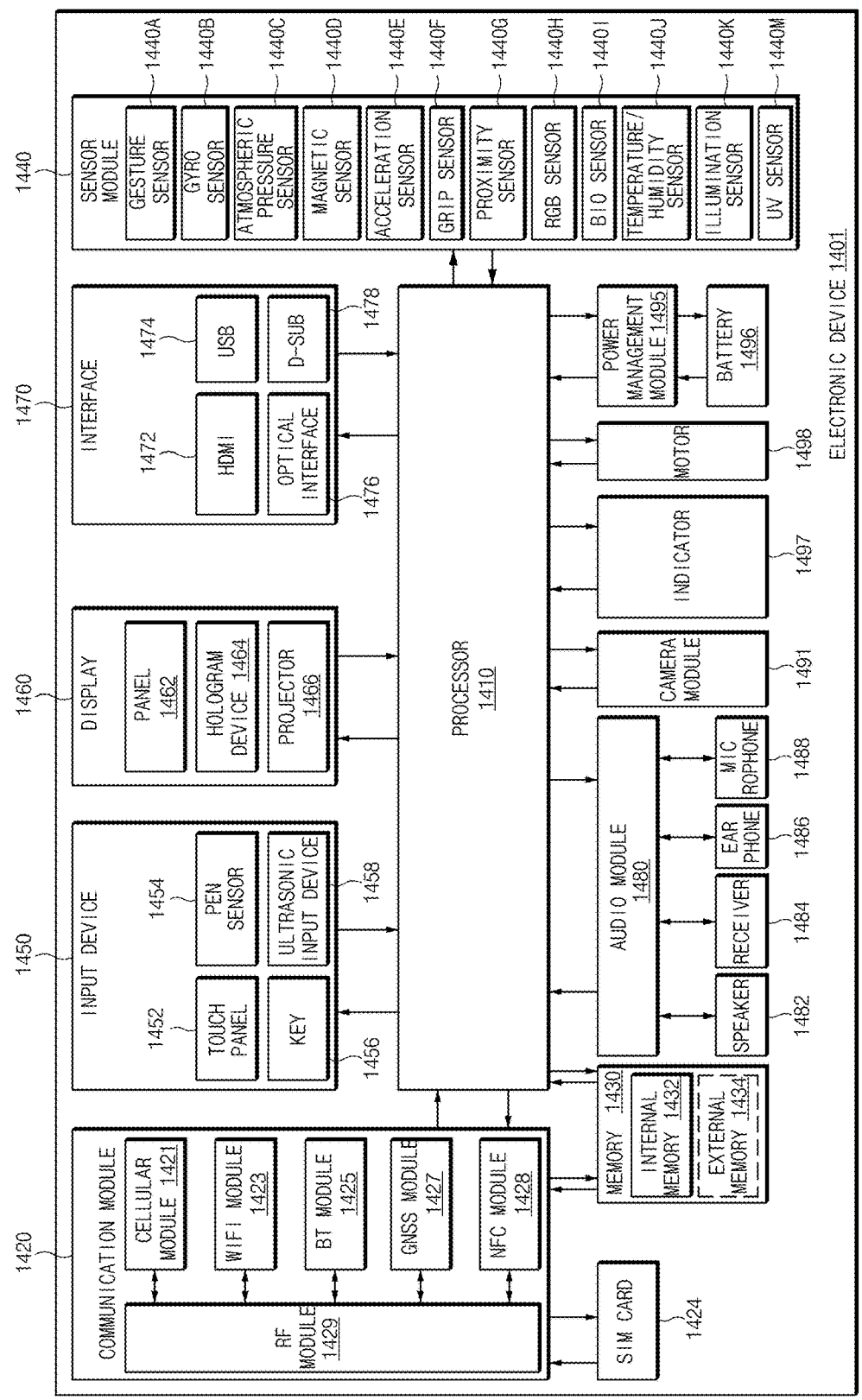
FIG. 14 is a block diagram illustrating an example electronic device according to an example embodiment of the present disclosure.

FIG. 14 is a block diagram illustrating an example electronic device according to an example embodiment of the present disclosure.

Referring to FIG. 14, an electronic device 1401 may include, for example, a part or the entirety of the electronic device 1301 illustrated in FIG. 13. The electronic device 1401 may include at least one processor (e.g., AP) (e.g., including processing circuitry) 1410, a communication module (e.g., including communication circuitry) 1420, a subscriber identification module (SIM) 1424, a memory 1430, a sensor module 1440, an input device (e.g., including input circuitry) 1450, a display 1460, an interface (e.g., including interface circuitry) 1470, an audio module 1480, a camera module 1491, a power management module 1495, a battery 1496, an indicator 1497, and a motor 1498.

The processor 1410 may include various processing circuitry and run an operating system or an application program so as to control a plurality of hardware or software elements connected to the processor 1410, and may process various data and perform operations. The processor 1410 may be implemented with, for example, a system on chip (SoC). According to an embodiment of the present disclosure, the processor 1410 may further include a graphic processing unit (GPU) and/or an image signal processor. The processor 1410 may include at least a portion (e.g., a cellular module 1421) of the elements illustrated in FIG. 14. The processor 1410 may load, on a volatile memory, an instruction or data received from at least one of other elements (e.g., a nonvolatile memory) to process the instruction or data, and may store various data in a nonvolatile memory.

The communication module 1420 may have a configuration that is the same as or similar to that of the communication interface 1370 of FIG. 13. The communication module 1420 may include various communication circuitry, such as, for example, and without limitation, at least one of a cellular module 1421, a Wi-Fi module 1423, a Bluetooth (BT) module 1425, a GNSS module 1427 (e.g., a GPS module, a GLONASS module, a BeiDou module, or a Galileo module), a NFC module 1428, and a radio frequency (RF) module 1429.

The cellular module 1421 may provide, for example, a voice call service, a video call service, a text message service, or an Internet service through a communication network. The cellular module 1421 may identify and authenticate the electronic device 1401 in the communication network using the subscriber identification module 1424 (e.g., a SIM card). The cellular module 1421 may perform at least a part of functions that may be provided by the processor 1410. The cellular module 1421 may include a communication processor (CP).

Each of the Wi-Fi module 1423, the Bluetooth module 1425, the GNSS module 1427 and the NFC module 1428 may include, for example, a processor for processing data transmitted/received through the modules. According to some various embodiments of the present disclosure, at least a part (e.g., two or more) of the cellular module 1421, the Wi-Fi module 1423, the Bluetooth module 1425, the GNSS module 1427, and the NFC module 1428 may be included in a single integrated chip (IC) or IC package.

The RF module 1429 may transmit/receive, for example, communication signals (e.g., RF signals). The RF module 1429 may include, for example, a transceiver, a power amp module (PAM), a frequency filter, a low noise amplifier (LNA), an antenna, or the like. According to another embodiment of the present disclosure, at least one of the cellular module 1421, the Wi-Fi module 1423, the Bluetooth module 1425, the GNSS module 1427, or the NFC module 1428 may transmit/receive RF signals through a separate RF module.

The SIM 1424 may include, for example, an embedded SIM and/or a card containing the subscriber identification module, and may include unique identification information (e.g., an integrated circuit card identifier (ICCID)) or subscriber information (e.g., international mobile subscriber identity (IMSI)).

The memory 1430 (e.g., the memory 1330) may include, for example, an internal memory 1432 and/or an external memory 1434. The internal memory 1432 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1434 may include a flash drive such as a compact flash (CF), a secure digital (SD), a Micro-SD, a Mini-SD, an extreme digital (xD), a MultiMediaCard (MMC), a memory stick, or the like. The external memory 1434 may be operatively and/or physically connected to the electronic device 1401 through various interfaces.

The sensor module 1440 may, for example, measure physical quantity or detect an operation state of the electronic device 1401 so as to convert measured or detected information into an electrical signal. The sensor module 1440 may include, for example, at least one of a gesture sensor 1440A, a gyro sensor 1440B, a barometric (e.g., atmospheric) pressure sensor 1440C, a magnetic sensor 1440D, an acceleration sensor 1440E, a grip sensor 1440F, a proximity sensor 1440G, a color sensor 1440H (e.g., a red/green/blue (RGB) sensor), a biometric (bio) sensor 1440I, a temperature/humidity sensor 1440J, an illumination sensor 1440K, or an ultraviolet (UV) sensor 1440M. Additionally or alternatively, the sensor module 1440 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1440 may further include a control circuit for controlling at least one sensor included therein. In some various embodiments of the present disclosure, the electronic device 1401 may further include a processor configured to control the sensor module 1440 as a part of the processor 1410 or separately, so that the sensor module 1440 is controlled while the processor 1410 is in a sleep state.

The input device 1450 may include various input circuitry, such as, for example, and without limitation, at least one of a touch panel 1452, a (digital) pen sensor 1454, a key 1456, or an ultrasonic input device 1458. The touch panel 1452 may employ at least one of capacitive, resistive, infrared, and ultraviolet sensing methods. The touch panel 1452 may further include a control circuit. The touch panel 1452 may further include a tactile layer so as to provide a haptic feedback to a user.

The (digital) pen sensor 1454 may include, for example, a sheet for recognition which is a part of a touch panel or is separate. The key 1456 may include, for example, a physical button, an optical button, or a keypad. The ultrasonic input device 1458 may sense ultrasonic waves generated by an input tool through a microphone 1488 so as to identify data corresponding to the ultrasonic waves sensed.

The display 1460 (e.g., the display 1360) may include a panel 1462, a hologram device 1464, or a projector 1466. The panel 1462 may have a configuration that is the same as or similar to that of the display 1360 of FIG. 13. The panel 1462 may be, for example, flexible, transparent, or wearable. The panel 1462 and the touch panel 1452 may be integrated into a single module. The hologram device 1464 may display a stereoscopic image in a space using a light interference phenomenon. The projector 1466 may project light onto a screen so as to display an image. The screen may be disposed in the inside or the outside of the electronic device 1401. According to an embodiment of the present disclosure, the display 1460 may further include a control circuit for controlling the panel 1462, the hologram device 1464, or the projector 1466.

The interface 1470 may include various interface circuitry, such as, for example, and without limitation, at least one of an HDMI 1472, a USB 1474, an optical interface 1476, or a D-subminiature (D-sub) 1478. The interface 1470, for example, may be included in the communication interface 1370 illustrated in FIG. 13. Additionally or alternatively, the interface 1470 may include, for example, a mobile high-definition link (MHL) interface, an SD card/multi-media card (MMC) interface, or an infrared data association (IrDA) interface.

The audio module 1480 may convert, for example, a sound into an electrical signal or vice versa. At least a portion of elements of the audio module 1480 may be included in the input/output interface 1350 illustrated in FIG. 13. The audio module 1480 may process sound information input or output through a speaker 1482, a receiver 1484, an earphone 1486, or the microphone 1488.

The camera module 1491 is, for example, a device for shooting a still image or a video. According to an embodiment of the present disclosure, the camera module 1491 may include at least one image sensor (e.g., a front sensor or a rear sensor), a lens, an image signal processor (ISP), or a flash (e.g., an LED or a xenon lamp).

The power management module 1495 may manage power of the electronic device 1401. According to an embodiment of the present disclosure, the power management module 1495 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1496 and a voltage, current or temperature thereof while the battery is charged. The battery 1496 may include, for example, a rechargeable battery and/or a solar battery.

The indicator 1497 may display a specific state of the electronic device 1401 or a part thereof (e.g., the processor 1410), such as a booting state, a message state, a charging state, or the like. The motor 1498 may convert an electrical signal into a mechanical vibration, and may generate a vibration or haptic effect. Although not illustrated, a processing device (e.g., a GPU) for supporting a mobile TV may be included in the electronic device 1401. The processing device for supporting a mobile TV may process media data according to the standards of digital multimedia broadcasting (DMB), digital video broadcasting (DVB), Media-FLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 15:
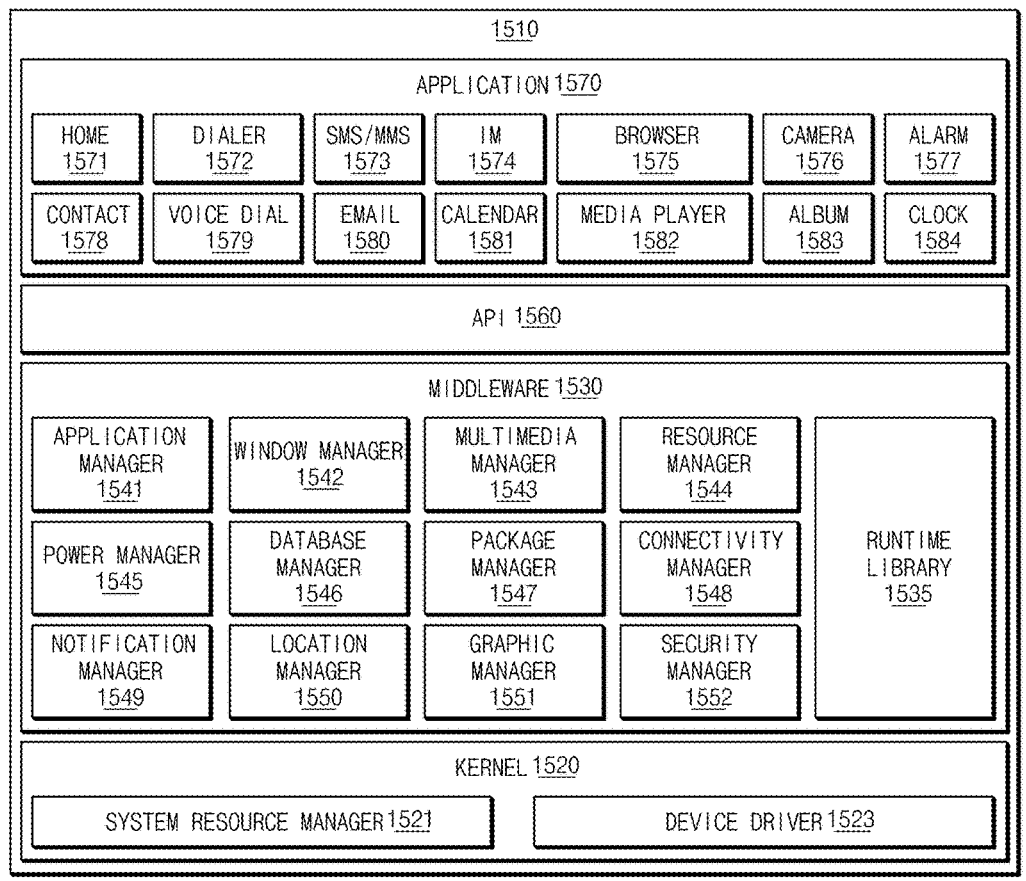
FIG. 15 is a block diagram illustrating an example program module according to an example embodiment of the present disclosure.

FIG. 15 is a block diagram illustrating an example program module according to an example embodiment of the present disclosure.

Referring to FIG. 15, a program module 1510 (e.g., the program 1340) may include an operating system (OS) for controlling a resource related to an electronic device (e.g., the electronic device 1301) and/or various applications (e.g., the application program 1347) running on the OS. The operating system may be, for example, Android, iOS, Windows, Symbian, Tizen, or the like.

The program module 1510 may include a kernel 1520, a middleware 1530, an API 1560, and/or an application 1570. At least a part of the program module 1510 may be preloaded on an electronic device or may be downloaded from an external electronic device (e.g., the first electronic device 1302, the second external electronic device 1304, or the server 1306).

The kernel 1520 (e.g., the kernel 1341) may include, for example, a system resource manager 1521 or a device driver 1523. The system resource manager 1521 may perform control, allocation, or retrieval of a system resource. According to an embodiment of the present disclosure, the system resource manager 1521 may include a process management unit, a memory management unit, a file system management unit, or the like. The device driver 1523 may include, for example, a display driver, a camera driver, a Bluetooth driver, a shared memory driver, a USB driver, a keypad driver, a Wi-Fi driver, an audio driver, or an inter-process communication (IPC) driver.

The middleware 1530, for example, may provide a function that the applications 1570 require in common, or may provide various functions to the applications 1570 through the API 1560 so that the applications 1570 may efficiently use limited system resources in the electronic device. According to an embodiment of the present disclosure, the middleware 1530 (e.g., the middleware 1343) may include at least one of a runtime library 1535, an application manager 1541, a window manager 1542, a multimedia manager 1543, a resource manager 1544, a power manager 1545, a database manager 1546, a package manager 1547, a connectivity manager 1548, a notification manager 1549, a location manager 1550, a graphic manager 1551, and a security manager 1552.

The runtime library 1535 may include, for example, a library module that a complier uses to add a new function through a programming language while the application 1570 is running. The runtime library 1535 may perform a function for input/output management, memory management, or an arithmetic function.

The application manager 1541 may mange, for example, a life cycle of at least one of the applications 1570. The window manager 1542 may manage a GUI resource used in a screen. The multimedia manager 1543 may recognize a format required for playing various media files and may encode or decode a media file using a codec matched to the format. The resource manager 1544 may manage a resource such as a source code, a memory, or a storage space of at least one of the applications 1570.

The power manager 1545, for example, may operate together with a basic input/output system (BIOS) to manage a battery or power and may provide power information required for operating the electronic device. The database manager 1546 may generate, search, or modify a database to be used in at least one of the applications 1570. The package manager 1547 may manage installation or update of an application distributed in a package file format.

The connectivity manger 1548 may manage wireless connection of Wi-Fi, Bluetooth, or the like. The notification manager 1549 may display or notify an event such as message arrival, appointments, and proximity alerts in such a manner as not to disturb a user. The location manager 1550 may manage location information of the electronic device. The graphic manager 1551 may manage a graphic effect to be provided to a user or a user interface related thereto. The security manager 1552 may provide various security functions required for system security or user authentication. According to an embodiment of the present disclosure, in the case in which an electronic device (e.g., the electronic device 1301) includes a phone function, the middleware 1530 may further include a telephony manager for managing a voice or video call function of the electronic device.

The middleware 1530 may include a middleware module for forming a combination of various functions of the above-mentioned elements. The middleware 1530 may provide a module specialized for each type of an operating system to provide differentiated functions. Furthermore, the middleware 1530 may delete a part of existing elements or may add new elements dynamically.

The API 1560 (e.g., the API 1345) which is, for example, a set of API programming functions may be provided in different configurations according to an operating system. For example, in the case of Android or iOS, one API set may be provided for each platform, and, in the case of Tizen, at least two API sets may be provided for each platform.

The application 1570 (e.g., the application program 1347), for example, may include at least one application capable of performing functions such as a home 1571, a dialer 1572, an SMS/MMS 1573, an instant message (IM) 1574, a browser 1575, a camera 1576, an alarm 1577, a contact 1578, a voice dial 1579, an e-mail 1580, a calendar 1581, a media player 1582, an album 1583, a clock 1584. Additionally or alternatively, though not shown, the application 1570 may include applications related to health care (e.g., measure an exercise amount or blood sugar), or environmental information provision (e.g., provide air pressure, humidity, or temperature information).

According to an embodiment of the present disclosure, the application 1570 may include an information exchange application for supporting information exchange between the electronic device (e.g., the electronic device 1301) and an external electronic device (e.g., the first electronic device 1302 or the second external electronic device 1304). The information exchange application may include, for example, a notification relay application for relaying specific information to the external electronic device or a device management application for managing the external electronic device.

For example, the notification relay application may have a function for relaying, to an external electronic device (e.g., the first electronic device 1302 or the second external electronic device 1304), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 1302 or the second external electronic device 1304) communicating with the electronic device, an application running in the external electronic device, or a service (e.g., a call service, a message service, or the like) provided from the external electronic device.

According to an embodiment of the present disclosure, the application 1570 may include a specified application (e.g., a healthcare application of a mobile medical device) according to an attribute of the external electronic device (e.g., the first electronic device 1302 or the second external electronic device 1304). The application 1570 may include an application received from an external electronic device (e.g., the first electronic device 1302 or the second external electronic device 1304). The application 1570 may include a preloaded application or a third-party application downloadable from a server. The names of the elements of the program module 1510 illustrated may vary with the type of an operating system.

According to various embodiments of the present disclosure, at least a part of the program module 1510 may be implemented with software, firmware, hardware, or a combination thereof. At least a part of the program module 1510, for example, may be implemented (e.g., executed) by a processor (e.g., the processor 1410). At least a part of the program module 1510 may include, for example, a module, a program, a routine, sets of instructions, or a process for performing at least one function.

Figure 16:
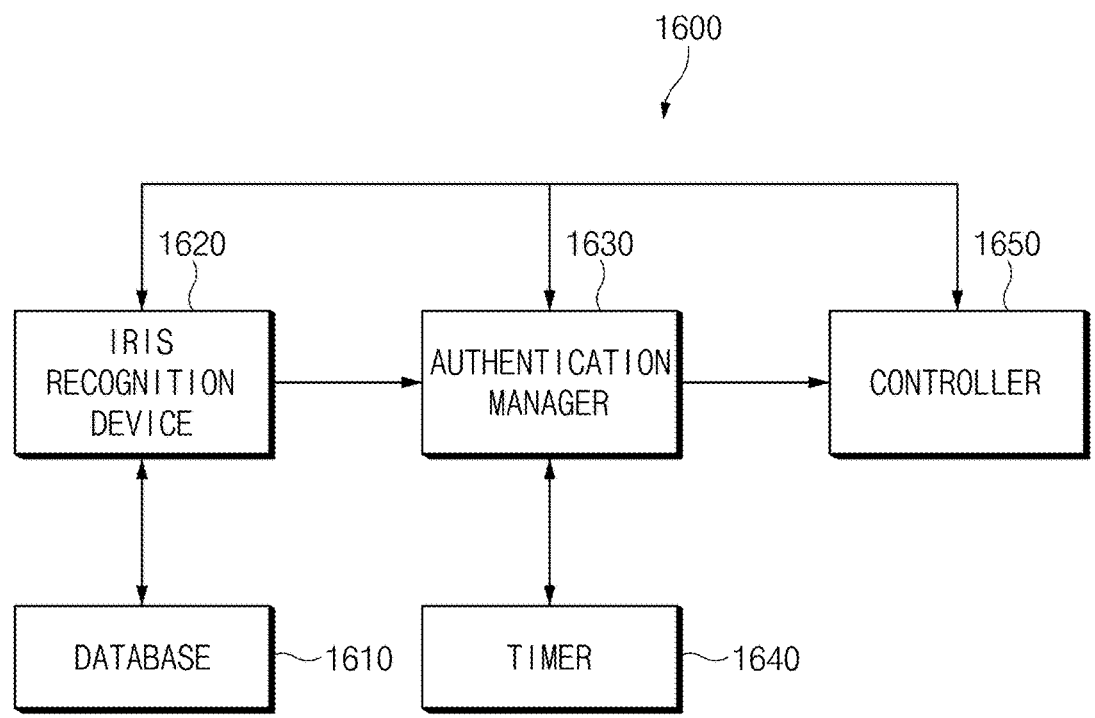
FIG. 16 is a block diagram illustrating an example iris authentication system according to an example embodiment.

FIG. 16 is a block diagram illustrating an example iris authentication system according to an example embodiment.

As illustrated in FIG. 16, an iris authentication system 1600 according to an embodiment of the present disclosure may include a database 1610, an iris recognition device (e.g., including iris recognition circuitry) 1620, an authentication manager (e.g., including authentication circuitry and/or program elements) 1630, a timer 1640, and/or a controller (e.g., including processing circuitry) 1650. According to various embodiments of the present disclosure, at least one of the database 1610, the iris recognition device 1620, the authentication manager 1630, the timer 1640, and/or the controller 1650, for example, the database 1610 and the authentication manager 1630 may be omitted from the iris authentication system 1600. According to various embodiments of the present disclosure, the components included in the iris authentication system 1600 may be included in different electronic devices. For example, a first component (e.g., the database 1610, the authentication manager 1630, or the like) may be included in a server, and a second component (e.g., the iris recognition device 1620) may be included in a mobile terminal.

The database 1610 may store information (such as a registered pattern, recognition time, first and second threshold time, or the like) that is necessary for iris authentication.

The iris recognition device 1620 may include various circuitry and extract iris characteristics from the frame of a preview image and may compare the extracted iris characteristics and the registered iris information through pattern matching. The iris recognition device 1620 may process the image frame to determine whether a biometric eye image is included in an eye region, and may use an un-falsified biometric eye image to extract characteristics of irises.

The iris recognition device 1620 may output an authentication success message if the extracted iris characteristics agree with the registered iris information, and may output an authentication failure message if not.

When an application requests iris authentication from the controller 1650, the controller 1650 may drive the iris recognition device 1620 and the authentication manager 1630 to perform the iris authentication.

The controller 1650 may output at least one of a preview image, a guide image, and a graphic object image on at least part of a display during the iris authentication. The controller 1650 may process or compose at least one of the preview image, the guide image, and the graphic image to output the resultant image.

At least one of the elements of the iris authentication system 1600 described above may be included in the IR sensor 254 illustrated in FIG. 2.

As described above, according to various example embodiments, an electronic device may include a housing that comprising a first surface facing a first direction, a second surface facing a second direction opposite the first direction, and a side surface surrounding at least part of space between the first surface and the second surface, a display disposed inside the housing and exposed through a first region of the first surface, an optical module comprising optical circuitry disposed inside the housing and configured to receive and/or emit infrared radiation, wherein the optical module is disposed below a second region of the first surface, that is adjacent to the first region of the first surface, and a processor electrically connected with the display and the optical module. The first surface may include a glass layer that is substantially transparent, a film layer disposed under a rear surface of the glass layer and including an opening overlapping at least part of the optical module and having a dimension corresponding to at least part of the optical module when viewed from above the first surface, and a visible-light-absorbing member comprising a visible-light-absorbing material disposed under the rear surface of the glass layer, the visible-light-absorbing member being overlapping at least part of the opening when viewed from above the first surface. The visible-light-absorbing member may absorb light in a first wavelength range and allow light in a second wavelength range to pass through the visible-light-absorbing member.

According to various example embodiments, the first wavelength range may include a wavelength in a range of 700 nm to 780 nm.

According to various example embodiments, the second wavelength range may include a wavelength in a range of 810 nm to 940 nm.

According to various example embodiments, the visible-light-absorbing member may include at least one of: polycarbonate, cycloolefin, cycloolefin polymer, and cycloolefin copolymer.

According to various example embodiments, the visible-light-absorbing member may be spaced apart from an upper end of the optical module by a distance of 8 mm or less.

According to various example embodiments, the visible-light-absorbing member may be attached to a rear surface of the film layer to cover at least part of the opening.

According to various example embodiments, the visible-light-absorbing member may be inserted into the opening and attached to the rear surface of the glass layer.

According to various example embodiments, a surface of the visible-light-absorbing member, the surface facing the optical module, may be inclined at a specified angle in reference to the rear surface of the glass layer.

According to various example embodiments, the electronic device may further include a proximity illuminance sensor disposed inside the housing and configured to sense an object within a predetermined proximity of the electronic device and/or ambient illuminance, wherein the proximity illuminance sensor is disposed below the second region of the first surface, and adjacent to the optical module.

According to various example embodiments, the proximity illuminance sensor may be spaced apart from the optical module by a distance of 15 mm or less.

According to various example embodiments, the processor may be configured to deactivate the optical module when the object is within a specified distance from the electronic device.

As described above, according to various example embodiments, an electronic device may include a housing comprising a first surface facing a first direction, a second surface facing a second direction opposite the first direction, and a side surface surrounding at least part of space between the first surface and the second surface, a display disposed inside the housing and exposed through a first region of the first surface, an optical module comprising optical circuitry disposed inside the housing and configured to receive and/or emit infrared radiation, wherein the optical module is disposed below a second region of the first surface that is adjacent to the first region of the first surface, and a processor electrically connected with the display and the optical module. The first surface may include a glass layer that is substantially transparent, and a film layer disposed on a rear surface of the glass layer and including an opening that overlaps at least part of the optical module and has a dimension corresponding to at least part of the optical module when viewed from above the first surface. The optical module may include an infrared sensor unit comprising infrared sensing circuitry that includes at least one of: a light-emitting element configured to irradiate light to a subject and a light-receiving element configured to receive light reflected from the subject, and a lens disposed above the infrared sensor unit and configured to adjust a beam angle of light emitted from the light-emitting element. The lens may include a visible-light-absorbing material configured to absorb light in a first wavelength range and to allow light in a second wavelength range to pass through the visible-light-absorbing material.

According to various example embodiments, the lens may be spaced apart from an upper end of the infrared sensor unit by a distance of 8 mm or less.

According to various example embodiments, the lens may have at least one spherical surface.

According to various example embodiments, a surface of the lens, the surface facing the first surface, may be inclined at a specified angle in reference to the rear surface of the glass layer.

According to various example embodiments, the lens may have a surface that faces the infrared sensor unit and has a saw-tooth pattern.

According to various example embodiments, the optical module may further include a case surrounding the infrared sensor unit and having space in which the infrared sensor unit is seated. The lens may be formed to cover at least one of an upper end of the case and part of a side surface of the case.

As described above, according to various example embodiments, an electronic device may include a housing that comprising first surface facing a first direction, a second surface facing a second direction opposite the first direction, and a side surface surrounding at least part of space between the first surface and the second surface, a touch screen display disposed inside the housing and exposed through a first region of the first surface, a light-emitting element comprising light-emitting circuitry disposed to emit light through a first opening formed in a second region of the first surface that is adjacent to the first region of the first surface, a light-receiving element comprising light-receiving circuitry disposed to receive at least part of the emitted light through a second opening formed in a third region of the first surface that is adjacent to the second region of the first surface, a layer disposed inside the housing to correspond to the second region, wherein the layer includes a material that allows infrared radiation emitted from the light-emitting element to pass through the material to the outside while absorbing (or blocking) at least part of visible light emitted from the light-emitting element from being released from the housing to the outside, at least one processor electrically connected with the touch screen display, the light-emitting element, and the light-receiving element, and memory electrically connected with the at least one processor. The memory may store an instruction that, when executed by the at least one processor, causes the at least one processor to operate the light-emitting element in response to an input, to acquire an image using the light-receiving element when the light-emitting element operates, and to compare the acquired image with a pre-stored reference image.

According to various example embodiments, the material may have a refractive index ranging from 1.45 to 1.68.

According to various example embodiments, the layer including the material may be spaced apart from an upper end of at least one of the light-emitting element and the light-receiving element by a distance of 8 mm or less.

The term "module" used herein may refer, for example, to a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include, for example, and without limitation at least one of a dedicated processor, a CPU, an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1320), the processor may perform functions corresponding to the instructions. The computer-readable storage medium may be, for example, the memory 1330.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been illustrated and described with reference to various example embodiments thereof, it will be understood by those skilled in the art that various changes in form and details may be made therein without departing from the scope of the present disclosure. Therefore, the scope of the present disclosure should not be defined as being limited to the example embodiments, but should be defined by the appended claims and equivalents thereof.

What is claimed is:

1. An electronic device comprising:
   a housing comprising a first surface facing a first direction, a second surface facing a second direction opposite the first direction, and a side surface surrounding at least part of space between the first surface and the second surface;
   a display disposed inside the housing and exposed through a first region of the first surface;
   an optical module comprising optical circuitry disposed inside the housing and configured to receive and/or emit infrared radiation, wherein the optical module is disposed below a second region of the first surface adjacent to the first region of the first surface; and a processor electrically connected with the display and the optical module, wherein the first surface includes:

a glass layer that is substantially transparent;

a film layer disposed under a rear surface of the glass layer and including an opening overlapping at least part of the optical module and having a dimension corresponding to at least part of the optical module when viewed from above the first surface; and a visible-light-absorbing member comprising a visible-light-absorbing material disposed under the rear surface of the glass layer, the visible-light-absorbing member overlapping at least part of the opening when viewed from above the first surface, and wherein the visible-light-absorbing member is configured to absorb light in a first wavelength range and to allow light in a second wavelength range to pass through the visible-light-absorbing member.

2. The electronic device of claim 1, wherein the first wavelength range includes a wavelength in a range of 700 nm to 780 nm.

3. The electronic device of claim 1, wherein the second wavelength range includes a wavelength in a range of 810 nm to 940 nm.

4. The electronic device of claim 1, wherein the visible-light-absorbing material includes at least one of: polycarbonate, cycloolefin, cycloolefin polymer, and cycloolefin copolymer.

5. The electronic device of claim 1, wherein the visible-light-absorbing member is spaced apart from an upper end of the optical module by a distance of 8 mm or less.

6. The electronic device of claim 1, wherein the visible-light-absorbing member is attached to a rear surface of the film layer to cover at least part of the opening.

7. The electronic device of claim 1, wherein the visible-light-absorbing member is disposed in the opening and attached to the rear surface of the glass layer.

8. The electronic device of claim 1, wherein a surface of the visible-light-absorbing member, the surface facing the optical module, is inclined at a specified angle in reference to the rear surface of the glass layer.

9. The electronic device of claim 1, further comprising:

a proximity illuminance sensor disposed inside the housing and configured to sense an object within a predetermined proximity of the electronic device and/or ambient light, wherein the proximity illuminance sensor is disposed below the second region of the first surface and adjacent to the optical module.

10. The electronic device of claim 9, wherein the proximity illuminance sensor is spaced apart from the optical module by a distance of 15 mm or less.

11. The electronic device of claim 9, wherein the processor is configured to deactivate the optical module when the object is within a specified distance from the electronic device.

* * * * *